US012299692B2

United States Patent
Filter et al.

(10) Patent No.: US 12,299,692 B2
(45) Date of Patent: May 13, 2025

(54) OFFLINE INTERACTION MODE OF A DIGITAL ASSET-BASED INTERACTION SYSTEM

(71) Applicant: Flexa Inc., New York, NY (US)

(72) Inventors: Trevor Filter, New York, NY (US); Zachary Kilgore, Brooklyn, NY (US); Tyler Robert Spalding, New York, NY (US)

(73) Assignee: Flexa Inc., New York, NY (US)

( * ) Notice: Subject to any disclaimer, the term of this patent is extended or adjusted under 35 U.S.C. 154(b) by 0 days.

(21) Appl. No.: 17/804,516

(22) Filed: May 27, 2022

(65) Prior Publication Data

US 2023/0116535 A1    Apr. 13, 2023

Related U.S. Application Data

(63) Continuation of application No. 17/449,367, filed on Sep. 29, 2021.

(51) Int. Cl.
  *G06Q 20/40*    (2012.01)
  *G06Q 20/38*    (2012.01)
  *H04L 9/00*    (2022.01)
  *H04L 9/32*    (2006.01)

(52) U.S. Cl.
  CPC ..... *G06Q 20/4097* (2013.01); *G06Q 20/3829* (2013.01); *H04L 9/3297* (2013.01); *H04L 9/50* (2022.05); *H04L 2209/56* (2013.01)

(58) Field of Classification Search
  None
  See application file for complete search history.

(56) References Cited

U.S. PATENT DOCUMENTS

| | | | |
|---|---|---|---|
| 10,049,349 B1 * | 8/2018 | Grassadonia | G06Q 20/40 |
| 10,366,378 B1 * | 7/2019 | Han | G06Q 20/204 |
| 10,540,639 B2 | 1/2020 | Brock | |
| 10,797,871 B1 * | 10/2020 | McCormack | H04L 9/0643 |
| 10,915,884 B2 * | 2/2021 | Bhat | G06Q 20/3274 |
| 2007/0255662 A1 * | 11/2007 | Tumminaro | G06Q 20/10 705/79 |

(Continued)

*Primary Examiner* — Courtney P Jones
*Assistant Examiner* — Christine Dang
(74) *Attorney, Agent, or Firm* — Garlick & Markison; Patricia M. Healy

(57) ABSTRACT

A method includes initiating, by a first computing entity, an interaction with a second computing entity. The interaction includes the first computing entity providing an amount of a digital asset and the second computing entity accepting assets in a desired asset format. When in an offline interaction mode, the method includes generating, by the first computing entity, an authorization code including a type of the digital asset and code authentication information and providing the authorization code to the second computing entity. The method further includes sending, by the second computing entity, at least a portion of the authorization code to a digital asset-based interaction computing entity. The method further includes verifying, by the digital asset-based interaction computing entity, the at least the portion of the authorization code, locking an amount of system digital asset to back the amount of the digital asset, and sending confirmation to the second computing entity.

16 Claims, 18 Drawing Sheets

(56) References Cited

U.S. PATENT DOCUMENTS

| | | | |
|---|---|---|---|
| 2015/0262176 A1* | 9/2015 | Langschaedel | G06Q 20/0658 |
| | | | 705/44 |
| 2018/0068130 A1* | 3/2018 | Chan | G06F 21/606 |
| 2020/0013045 A1* | 1/2020 | Spalding | G06Q 20/065 |
| 2021/0012331 A1* | 1/2021 | Higgins | G06Q 20/3829 |
| 2021/0090697 A1* | 3/2021 | Weiss | H04L 63/0861 |
| 2021/0184854 A1* | 6/2021 | Pizot | H04L 9/14 |
| 2021/0234848 A1* | 7/2021 | Harris | H04W 12/06 |

* cited by examiner digital asset-based interaction system 10

OFFLINE INTERACTION MODE OF A DIGITAL ASSET-BASED INTERACTION SYSTEM

CROSS-REFERENCE TO RELATED APPLICATIONS

The present U.S. Utility Patent application claims priority pursuant to 35 U.S.C. § 120 as a continuation of U.S. Utility application Ser. No. 17/449,367, entitled "KEY CODE SHARE INTERACTION MODE OF A DIGITAL ASSET-BASED INTERACTION SYSTEM" filed Sep. 29, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates generally to digital asset-based interactions and more specifically to interaction modes of a digital asset-based interaction system.

Description of Related Art

Current payment systems are vulnerable to security breaches, fraud, and identity theft. A typical payment card transaction with a merchant involves several steps (e.g., payment card authorization, clearing, and settlement) and the participation of various entities (e.g., financial institutions, payment card companies, and payment processing networks). Each step and each entity have their own varying security limitations.

The steps involved are also inconvenient, time consuming, and expensive. For example, payment card authorization (e.g., credit or debit card authorization) begins with the cardholder presenting the payment card to a merchant for goods or service. The payment card is issued by a particular financial institution (e.g., a bank) and is associated with a payment card network (e.g., Visa, Mastercard, etc.). The merchant uses a payment card machine, software, or gateway to transmit transaction data to their acquiring bank (or its processor). The acquiring bank routes the transaction data to a payment processing network and the payment processing network sends the transaction data to the cardholder's issuing bank. The issuing bank validates that the card has not been reported stolen or lost, confirms whether funds/credit is available, and sends a response code back through the payment processing network to the acquiring bank as to whether the transaction is approved.

The transaction data typically includes the payment card number, transaction amount, date, merchant's name, merchant's location, merchant category code, and an encrypted personal identification number (PIN) if entered. A response code reaches the merchant's terminal and is stored in a file until it is settled. The merchant sends the stored, approved transactions to its acquiring back (e.g., at the end of the day) and the acquiring bank reconciles and transmits approved transactions through the appropriate card-processing network. The acquiring bank deposits funds from sales into the merchant's account. The payment processing network debits the issuing bank account and credits the acquiring bank account for the amount of the transaction.

Merchants pay substantial payment card processing fees and those costs are passed along to consumers in the form of higher prices. Most merchants pay an interchange rate on a total transaction and a flat fee to the payment card company involved (e.g., Visa, Mastercard, etc.). Rates vary based on the payment card company, the payment card type (e.g., credit, debit, business, etc.), processing type (e.g., online payment, swiped, through a mobile device, card not present, etc.), and a Merchant Category Code (MCC) that classifies a merchant's type of business. Further, merchants typically pay a commission and a flat fee to the payment processing network.

Mobile wallet applications allow cardholders to store payment card data on a computing device via a digital wallet for more convenient transactions. For example, some mobile wallet apps use near field communication (NFC) for contactless payments (e.g., exchange of data by holding a device over a payment reader). NFC chips are specifically designed to manage financial security and only store data needed to initiate and complete a transaction. Mobile wallets use types of tokenization to assign a device account number (DAN) in place of an account or card number so that the DAN is passed to the merchant rather than the actual account/card number. As another security measure, digital wallets rely on digital certificates to verify identity. However, using a digital wallet on a device means data passes through not only the device's hardware and operating system but then also a specific payment app, and then finally the source of payment.

Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights.

Distributed ledger technology (DLT) is a digital system that provides a consensus of replicated, shared, and synchronized digital data spread across several nodes. Unlike traditional databases, DLTs often lack central authority. The nodes of a DLT implement a consensus protocol to validate the authenticity of transactions recorded in the ledger.

Distributed ledger technology reduces the risk of fraudulent activity. For example, a blockchain is a type of DLT consisting of a continuously growing list of blocks (i.e., groups of transactions) that are securely linked, continually reconciled, and shared among all network participants (i.e., a decentralized network). Transactions are validated and added to blocks via hashing algorithms, and then permanently written to the chain via consensus of the network. Once recorded on the blockchain, transactions cannot be altered.

A cryptocurrency is a digital asset that is created and transferred via cryptography. Many cryptocurrencies are distributed networks based on distributed ledger technology (e.g., a blockchain). Decentralized networks like Bitcoin use pseudo-anonymous transactions that are open and public (i.e., anyone can join, create, and view transactions). To eliminate fraudulent transactions and deter malicious network activity, cryptocurrency transactions can be recorded by "miners" using "proof of work" secure hashing algorithms (SHA-256) that require significant computing power. While many cryptocurrencies are blockchain based, other distributed ledger technologies may be used. For example, asynchronous consensus algorithms enable a network of nodes to communicate with each other and reach consensus in a decentralized manner. This method does not need miners to validate transactions and uses directed acyclic graphs for time-sequencing transactions without bundling them into blocks.

BRIEF DESCRIPTION OF THE SEVERAL VIEWS OF THE DRAWING(S)

DETAILED DESCRIPTION OF THE INVENTION

Figure 1:
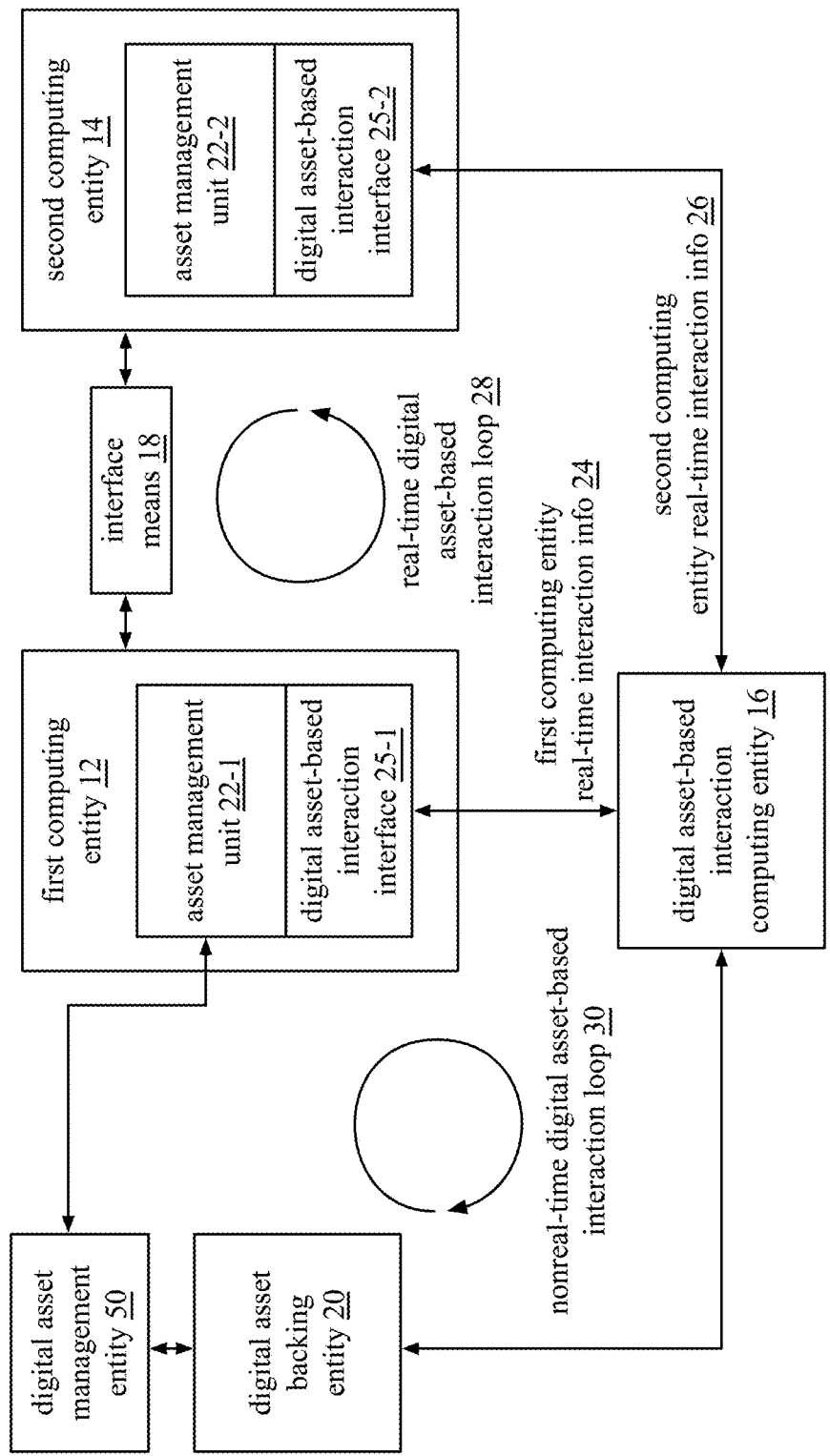
FIG. 1 is a schematic block diagram of an embodiment of a digital asset-based interaction system.

FIG. 1 is a schematic block diagram of an embodiment of a digital asset-based interaction system 10 that includes a first computing entity 12, a second computing entity 14, a digital asset-based interaction computing entity 16, an interface means 18, a digital asset backing computing entity 20, and a digital asset management computing entity 50. The digital asset-based interaction system 10 facilitates a digital asset-based interaction (e.g., a digital asset-based payment) between the first computing entity 12 and the second computing entity 14 where the first computing entity 12 provides a digital asset (e.g., cryptocurrency) and the second computing entity 14 (e.g., a merchant) accepts assets in a desired asset format (e.g., fiat currency, a specific digital asset) and overcomes the following issues.

At the filing of this application, digital assets such as cryptocurrency are not widely accepted by merchants as a form of payment for a variety of reasons. For one, many merchants do not want to hold cryptocurrency. Holding cryptocurrency involves several issues merchants are unfamiliar with and/or unequipped to deal with. These issues include holding private key information, legal compliance, government regulation, timing issues such as waiting for transaction confirmations, etc. Accepting digital assets such as cryptocurrency presents operational security issues and includes a level of technical complexity outside the scope of general merchant capabilities. Additionally, the value of cryptocurrency can be volatile, sometimes fluctuating dramatically in the course of one day. As another reason, merchants are reluctant to invest in expensive point-of-sale upgrades to accommodate cryptocurrency payments directly. As yet another reason, many cryptocurrency payments are public and potentially expose sensitive merchant/customer information.

While some digital wallet applications enable retail blockchain payments, they are universally dependent on existing payment networks and thus are susceptible to the fraud attacks of the existing payment networks. For example, a cryptocurrency is linked to a payment card (e.g., a credit card, debit card, gift card, etc.), where a cryptocurrency payment is converted and conducted as a payment card transaction and, thus susceptible to the same fraud attacks as the payment card. Further, a billing address and/or other personal customer information may be required for a merchant to verify traditional payment card payments. A merchant may store this information which consumes data storage space and renders additional private customer information vulnerable to theft and fraud. Additionally, the costs of the existing payment network (e.g., payment transaction costs, fees, etc.) are maintained. Adding a digital asset payment option within an existing payment network only increases those costs.

Even though digital asset payments such as cryptocurrency payments eliminate fraudulent activity as compared to traditional payment systems, malicious exploits using digital asset transactions are possible. For example, malicious users can manipulate a cryptocurrency blockchain to "double spend" (e.g., create one transaction within a block to transfer an amount to a merchant and create another block without that transaction such that the transfer to the merchant does not exist). As another example, malicious or faulty digital wallet software can prevent a digital asset transaction from being authorized and completed correctly.

Within the digital asset-based interaction system 10, the first computing entity 12, the second computing entity 14, the digital asset-based interaction computing entity 16, the digital asset backing computing entity 20, and the digital asset management computing entity 50 may be one or more computing devices, one or more distributed computing devices, and/or one or more modules executing on one or more computing devices.

The first computing entity 12, the second computing entity 14, the digital asset-based interaction computing entity 16, the digital asset backing computing entity 20, and the digital asset management computing entity 50 may be one or more portable computing devices and/or one or more fixed computing devices. A portable computing device may be a social networking device, a gaming device, a cell phone, a smart phone, a digital assistant, a digital music player, a digital video player, a laptop computer, a handheld computer, a tablet, a video game controller, a virtual reality (VR) computing device, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., attended cash register, unattended register, etc.), and/or any type of home or office computing equipment.

The digital asset-based interaction computing entity 16 is operable to convert (i.e., exchange) a digital asset (e.g., a cryptocurrency) to an asset in a desired asset format (e.g., fiat currency, another digital asset such as a different cryptocurrency, etc.), back digital-asset based interactions via the digital asset back entity 20 such that digital asset-based interactions can be authorized and/or completed successfully in real-time, and verify digital assets (e.g., connect to a consensus network that implements a verification method associated with the digital asset). Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights.

The digital asset-based interaction computing entity 16 may be associated with an entity specially licensed for exchange when licensing is required. In an embodiment, the digital asset-based interaction computing entity 16 may be associated with one or more digital asset holding companies. A digital asset holding company stores sensitive materials and has insurance policies to protect against theft and fraud. A digital asset holding company may be specially licensed for holding digital assets when licensing is required.

The digital asset-based interaction computing entity 16 may be associated with a stored value account (SVA) device where the SVA device is associated with the second computing entity 14 (e.g., a second computing entity has an SVA account with the SVA device) such that an SVA is generated for payment. In another embodiment, the digital asset-based interaction computing entity 16 is operable to generate stored value accounts (SVAs). Generation of SVAs for transactions is described in co-pending patent application Ser. No. 16/376,911, entitled, "SECURE AND TRUSTED DATA COMMUNICATION SYSTEM," filed Apr. 5, 2019.

Each of the first and second computing entities 12 and 14 include an asset management unit 22-1 and 22-2 respectively. The asset management units 22-1 and/or 22-2 may be digital wallet applications or network enabled smart contract applications installed on or otherwise usable by the first and second computing entities 12 and 14 that function to store and manage (e.g., buy, sell, trade, custody, etc.) digital assets. Alternatively, an asset management unit may be an application that facilitates receiving assets during an interaction such as POS software and/or hardware that may or may not include a digital wallet function depending on the types of assets a computing entity wishes to accept and the desired method of receiving those assets.

The asset management units 22-1 and/or 22-2 may be custodial digital wallet applications associated with a digital asset management computing entity 50 that may be specially licensed and insured to hold digital assets (e.g., a digital asset holding and management company, a cryptocurrency holding company, a cryptocurrency holding and exchange company, etc.). Alternatively, the asset management units 22-1 and/or 22-2 may be non-custodial digital wallet applications associated with a non-custodial digital asset management computing entity 50 (e.g., a digital asset exchange company) where the asset management units 22-1 and/or 22-2 store digital assets and the first and second computing entities 12-14 manage private keys to the asset management units 22-1 and/or 22-2.

Alternatively, the asset management units 22-1 and/or 22-2 may be custodial or non-custodial digital wallet applications associated with the digital asset-based interaction computing entity 16 (e.g., where the digital asset-based interaction computing entity 16 is a digital asset management computing entity 50). Alternatively, the asset management units 22-1 and/or 22-2 are network enabled smart contract applications. A network enabled smart contract application allows a user to upload digital assets to a network enabled smart contract using a private key (e.g., non-custodial) and eliminates double spending issues associated with non-custodial wallets.

The digital asset backing computing entity 20 may be a part of or separated from the digital asset-based interaction computing entity 16. The digital asset backing computing entity 20 stores (or otherwise has access to) system digital assets (e.g., system cryptocurrency, system tokens, etc.) as collateral to back digital asset-based interactions of the digital asset-based interaction system 10. The system digital assets may be any digital asset that the digital asset-based interaction system chooses to use. For example, the system digital asset is a token on the Ethereum blockchain specifically created for use in the digital asset-based interaction system. As another example, the system digital asset is an already established and trusted cryptocurrency.

The digital asset backing computing entity 20 is associated with the first computing entity 12, the second computing entity 14, and/or a type of digital asset. As an example, the digital asset backing computing entity 20 is associated with the asset management unit 22-1 of the first computing entity 12.

The digital asset management computing entity 50 is associated with the digital asset backing computing entity 20 via one or more accounts and is operable to deposit system digital assets into the one or more accounts to back digital asset-based interactions of users of an associated asset management unit (e.g., asset management unit 22-1). The digital asset management computing entity 50 is incentivized to back asset management unit interactions by receiving rewards from the digital asset backing computing entity 20 such as a percentage of system digital asset back on successful transactions. Additionally, the system digital asset provides payment utility such as lower foreign exchange rates.

Further, because the digital asset management computing entity 50 is backing the asset management unit interactions, the digital asset management computing entity 50 is incentivized to produce a quality asset management unit that prevents user fraud and to remedy faulty software that affects transaction success. When a computing entity functions to primarily receive assets (e.g., the computing entity is a merchant computing device), an asset management unit (e.g., asset management unit 22-2) is not necessarily associated with a digital asset management computing entity 50 if there is no need back digital assets (e.g., assets are received and not sent). For example, when the second computing entity 14 is a merchant computing entity, the asset management unit 22-2 may be merchant POS software enabled for use in the digital asset-based interaction system 10.

The digital asset management computing entity 50 is also referred to as a staking entity and in this example, is associated with a developer of the asset management units 22-1 and 22-2 (e.g., a digital wallet developer). In another embodiment, the asset management units 22-1 and 22-2 may be backed by a different and/or additional type(s) of staking entities such as one or more user computing devices, one or more merchant computing entities, one or more computing entities associated with a corporation and/or business, etc.

The asset management units 22-1 and 22-2 include digital asset-based interaction interfaces 25-1 and 25-2 operable to interface with the digital asset-based interaction computing entity 16. The digital asset-based interaction interfaces 25-1 and 25-2 are digital asset-based interaction computing entity application programming interfaces (APIs) integrated into asset management units 22-1 and 22-2 that allow the first and second computing entities 12 and 14 to connect to the digital asset-based interaction computing entity 16 for digital asset-based interactions. The digital asset-based interaction interfaces 25-1 and 25-2 facilitate digital asset-based interaction system 10 interactions and will be discussed in greater detail with reference to FIG. 4.

A digital asset-based interaction interface may be included in an asset management unit when the digital asset management computing entity 50 deposits system digital assets to back interactions made by the asset management unit or in an asset management unit that primarily receives assets (e.g., a merchant) via the digital asset-based interaction system 10. The first and second computing entities 12 and 14 are operable to establish an account with the digital asset-based interaction computing entity 16 to use the digital asset-based interaction interfaces 25-1 and 25-2. The first and second computing entities 12 and 14 are operable to access features of the digital asset-based interaction computing entity 16 via the digital asset-based interaction interfaces 25-1 and 25-2 (e.g., via a direct link or by signing in for temporary use).

The second computing entity 14 may be associated with a particular merchant that facilitates payments from the first computing device 12 to the merchant. For example, the second computing entity may be a fixed POS computing device, a merchant e-commerce website, a merchant mobile application ("app"), etc. The second computing entity 14 may include payment features tailored to the type of second computing entity 14 involved in a payment. For example, when the second computing entity 14 is a fixed POS computing device (e.g., a register), the second computing entity includes features for in-person payment interaction (e.g., a scanning device, a touchscreen, a receipt printer, etc.).

As another example, when the second computing entity 14 is an e-commerce website or merchant mobile application ("app") the second computing entity may include a variety of existing payment processing features (e.g., existing hardware and/or software) for processing online payments within existing payment networks (e.g., an Secure Socket Layers (SSL) certificate, e-commerce shopping cart software, order and product management features, customer profile management capabilities, a payment gateway, an e-commerce merchant account with a processing bank to accept credit and debit card payments, etc.).

The first computing entity 12 and the second computing entity 14 interact via the interface means 18. The interface means 18 is one or more of: a direct link and a network connection. The direct link includes one or more of: a scanning device (e.g., video, camera, infrared (IR), barcode scanner, etc.), radio frequency (RF), and/or near-field communication (NFC). The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

As an example, the first computing entity 12 is a smart phone, the second computing entity 14 is a fixed merchant POS device (e.g., a POS register) and the interface means 18 is the fixed merchant POS device's scanning device (e.g., camera, barcode scanner, etc.). As another example, the first computing entity 12 is a smart phone, the second computing entity 14 is a fixed merchant POS device (e.g., a POS register) and the interface means 18 is the smart phone's scanning device (e.g., a front or back camera).

As another example, the first computing entity 12 is a smart phone, the second computing entity 14 is an online POS connection device (e.g., an e-commerce website or e-commerce mobile app) and the interface means 18 is a network connection. For example, a smart phone uses an internet browser application (via cellular or wireless internet connection) to access a merchant's e-commerce website. As another example, a smart phone uses a network connection to connect to an installed merchant e-commerce mobile app.

As yet another example, a combination of interface means 18 is possible. For example, the first computing entity 12 is a smart phone and the second computing entity 14 is an online POS connection device (e.g., an e-commerce website). The e-commerce website is accessed via a network connection interface means 18 on a computing device associated with the user of the first computing entity 12 (e.g., a laptop or desktop computer). The computing device displays information for use by the first computing entity's scanning device (e.g., front or back camera).

In an example of operation, the first computing entity 12 and the second computing entity 14 interact via the interface means 18 to initiate a digital asset-based interaction (also referred to herein as "interaction"). A digital asset-based interaction involves sending digital asset-based value from the first computing entity to the second computing entity (e.g., a loan from the first computing entity to the second computing entity, a payment from the first computing entity to the second computing entity, a gift from the first computing entity to the second computing entity, etc.) where the second computing entity 14 accepts assets in a desired asset format (e.g., fiat currency or a desired digital asset that may differ from the digital asset the first computing entity 12 wishes to use in the interaction) and the first computing entity 12 provides a digital asset.

To initiate the interaction, the first computing entity 12 may display a unique scannable code to the second computing entity 14 when the interface means 18 is the second computing entity 14 scanning device. As another example, the first computing entity 12 may display and/or share an authorization key code when a code display interaction mode is disabled. As another example, the second computing entity 14 displays a unique scannable code for the first computing entity 12 when the interface means 18 is the first computing entity 12 scanning device. As another example, the second computing entity 14 may display and/or share an authorization key charge code when a code scan interaction mode is disabled. As another example, the first computing entity 12 connects to the second computing entity 14 via a network connection interface means 18 to initiate an interaction (e.g., when the second computing entity 14 is an e-commerce website). Modes of initiating interactions are discussed in more detail with reference to FIGS. 5-10C.

During the interaction initiation, the first computing entity 12 sends first computing entity real-time information 24 to the digital asset-based interaction computing entity 16 via the digital asset-based interaction interface 25-1 and/or the second computing entity 14 sends second computing entity real-time information 26 to the digital asset-based interaction computing entity 16 via its digital asset-based interaction interface 25-2 (e.g., from requesting a scannable code, from scanning a scannable code, from receiving an authorization key code, from an e-commerce website checkout option selection, etc.).

The first computing entity real-time information 24 includes at least an identifier (e.g., a user ID) and an indication of a type of digital asset the user of the first computing entity wishes to use in a digital-asset based interaction with the second computing entity 14. The second computing entity real-time information 26 includes at least an identifier (e.g., a user ID, a merchant ID, etc.) and an indication of a desired asset format (e.g., a fiat currency, a cryptocurrency, etc.) for receiving assets in the digital asset-based interaction. One or more of the first computing entity real-time information 24 and the second computing entity real-time information 26 includes the amount involved in the digital asset-based interaction. The first computing entity real-time information 24 and the second computing entity real-time information 26 may include further information and/or metadata such as loyalty information, personal information (address, name, etc.), shipping details, bill splitting information, a request for additional information, etc.

When the digital asset-based interaction computing entity 16 receives the first and second computing entity real-time information, the digital asset-based interaction computing entity 16 initiates: 1) a real-time digital asset-based interaction process (e.g., the real-time digital asset-based interaction loop 28) and 2) a nonreal-time digital asset-based interaction process to reconcile the digital asset-based interaction with the digital asset backing computing entity 20 (e.g., the nonreal-time digital asset-based interaction loop 30). The reconciliation of the digital asset-based interaction with the digital asset backing computing entity 20 occurs within a time frame that is longer than the time frame of the real-time digital asset-based interaction. For example, the reconciliation of the digital asset-based interaction with the digital asset backing computing entity 20 occurs over the course of minutes whereas the time frame of the real-time digital asset-based interaction takes a few seconds.

Within the nonreal-time digital asset-based interaction loop 30, when at least the first computing entity real-time information is received, the digital asset-based interaction computing entity 16 instructs the digital asset backing computing entity 20 to lock an amount of system digital asset associated with the digital asset-based interaction. When the digital asset-based interaction computing entity 16 locks the system digital asset, a rate quote for the amount of digital asset used by the first computing entity 12 is locked. An exchange rate is a price at which one digital asset will be exchanged for another. A rate quote is an exchange rate at a given point in time as determined by a digital asset exchange (e.g., cryptocurrency exchange) based on the buying and selling activity of the digital assets within the exchange. Locking a rate quote is discussed in more detail with reference to FIG. 2A.

Within the real-time digital asset-based interaction loop 28, when the digital asset-based interaction computing entity 16 receives an amount of digital asset from the first computing entity 12 to use in the digital asset-based interaction, a network acknowledgment (ACK) of the receipt of the amount of the digital asset is generated.

In an alternative embodiment, the ACK is generated after the system digital asset is locked and prior to receiving the amount of the digital asset from the first computing entity 12. For example, locking the system digital asset implies authorization of the interaction and the digital asset-based interaction computing entity 16 allows a time period (e.g., up to five minutes) prior to pulling digital assets from the first computing entity 12 (e.g., the first computing entity has time to add tip, split payment with another user, adjust type of digital asset used, etc.). The second computing entity 14 is provided a confirmation of this ACK. For example, when the second computing entity 14 is a POS computing device such as an attended register, this ACK may successfully end the in-person transaction such that a merchant and customer can part ways. However, the second computing entity 14 receives the payment up to a few minutes later. This embodiment is discussed in more detail with reference to FIG. 2A.

In another example, the ACK is generated after the amount of digital asset is received by the digital asset-based interaction computing entity 16 as previously discussed but the first computing entity 12 is provided a time period to provide the amount of the digital asset (e.g., the real-time digital asset-based interaction takes up to 5 minutes for the second computing entity 14 to confirm). For example, in a restaurant setting, where the second computing entity 14 is a merchant POS computing device, the merchant POS computing device may provide a first computing entity 12 a check to initiate a payment, however; the first computing entity is given time to add tip, split the bill, etc., prior to the merchant receiving funds.

If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28 (e.g., exchanging the digital asset to the desired asset format and sending the amount in the desired asset format to the second computing entity), the ACK is not generated, and the digital asset-based interaction is terminated. Within the nonreal-time digital asset-based interaction loop 30, when the ACK is not generated, the digital asset-based interaction computing entity 16 instructs the digital asset backing computing entity 20 to release the amount of locked system digital asset.

When the digital asset is managed by a distributed ledger technology (e.g., is a cryptocurrency), sending the amount of digital asset to the digital asset-based interaction computing entity 16 is a transaction added to the digital asset blockchain of the digital asset used by the first computing entity 12 (e.g., this information is published). However, other details related to the interaction (e.g., the identity of the second computing entity 14, transaction fees owed by the second computing entity 14, etc.) are managed privately by the digital asset-based interaction computing entity 16 off-chain. Therefore, the digital asset-based interaction system 10 keeps confidential second computing entity 14 related information (e.g., revenue, consumer spending behavior, etc.) and confidential first computing entity 12 related information (e.g., consumer identity of purchases, amount spent at a particular merchant, payees/merchants frequented, etc.) private (i.e., not published on a blockchain for anyone to see).

Continuing with the real-time digital asset-based interaction loop 28, when the ACK is generated and receipt of the amount of digital asset is received, the digital asset-based interaction computing entity 16 exchanges the amount of the digital asset received from the first computing entity 12 to an amount in the desired asset format. Digital asset exchange is done quickly (e.g., 30 seconds to a few minutes) to account for exchange rate volatility. The exchange can also be performed in real time on a credit-based account to eliminate any pricing volatility. The digital asset-based interaction computing entity 16 sends the amount in the desired asset format to the second computing entity 14 to complete the real-time portion of the digital asset-based interaction.

Continuing with the nonreal-time digital asset-based interaction loop 30, the digital asset-based interaction computing entity 16 verifies the amount of the digital asset received from the first computing entity 12. For example, the digital asset-based interaction computing entity 16 connects to a consensus network that verifies the amount of the digital asset received from the first computing entity 12. The consensus network implements a verification process that may take minutes to hours of time.

For example, in the Bitcoin blockchain, miners record new transactions into blocks that verify all previous transactions within the blockchain. At the filing of this application, it takes a miner ten minutes, on average, to write a block on the Bitcoin blockchain. The average block time depends on a total hash power of the Bitcoin network. Once a block is created and a new transaction is verified and included in a block, the transaction will have one confirmation. Each subsequent block (which verifies the previous state of the blockchain) provides one additional network confirmation.

Typically, between 5-10 transaction confirmations (depending on the monetary value of the transaction) are acceptable for cryptocurrency exchanges to avoid losses due to potential fraud. Therefore, if the first computing entity 12 is using Bitcoin, the digital asset-based interaction computing entity 16 seeks a desired number of confirmations of the amount of the cryptocurrency received by the first computing entity 12 from the consensus network 16 (e.g., via Bitcoin miners). The transaction may not be verified by the digital asset-based interaction computing entity 16 for an hour or more. As such, the nonreal-time digital asset-based interaction loop 30 takes longer than the real-time digital asset-based interaction loop 28.

When the digital asset-based interaction computing entity 16 verifies the amount of the digital asset received by the first computing entity 12, the digital asset-based interaction computing entity 16 instructs the digital asset backing computing entity 20 to release the amount of system digital asset associated with the real-time digital asset interaction. When the digital asset-based interaction computing entity 16 does not verify the amount of the digital asset received by the first computing entity 12, the digital asset-based interaction computing entity 16 instructs the digital asset backing computing entity 20 to consume the amount of system digital asset associated with the real-time digital asset interaction.

For example, if fraudulent activity occurs (e.g., the first computing entity acts maliciously to spend at two merchants simultaneously, software of the asset management unit 22-1 is corrupted, etc.) the digital asset-based interaction computing entity 16 consumes the amount of system digital asset associated with the real-time digital asset interaction. As a specific example, if the first computing entity 12 attempts to double spend a transaction, the verification (e.g., the desired number of confirmations in a Bitcoin blockchain example) will not be received and the digital asset-based interaction computing entity 16 will not be able to verify the amount of the digital asset received by the first computing entity 12.

If the verification is not received, the digital asset-based interaction computing entity 16 withdraws (e.g., consumes) the amount of system digital asset locked by the digital asset backing computing entity 20 to cover the real-time digital asset interaction that occurred with the second computing entity 14. Consuming the amount of system digital asset means that the amount of system digital asset is transferred (e.g., via an on-chain transaction) from an address associated with the digital asset management computing entity 50 to an address associated with the digital asset-based interaction computing entity 16.

Figure 2:
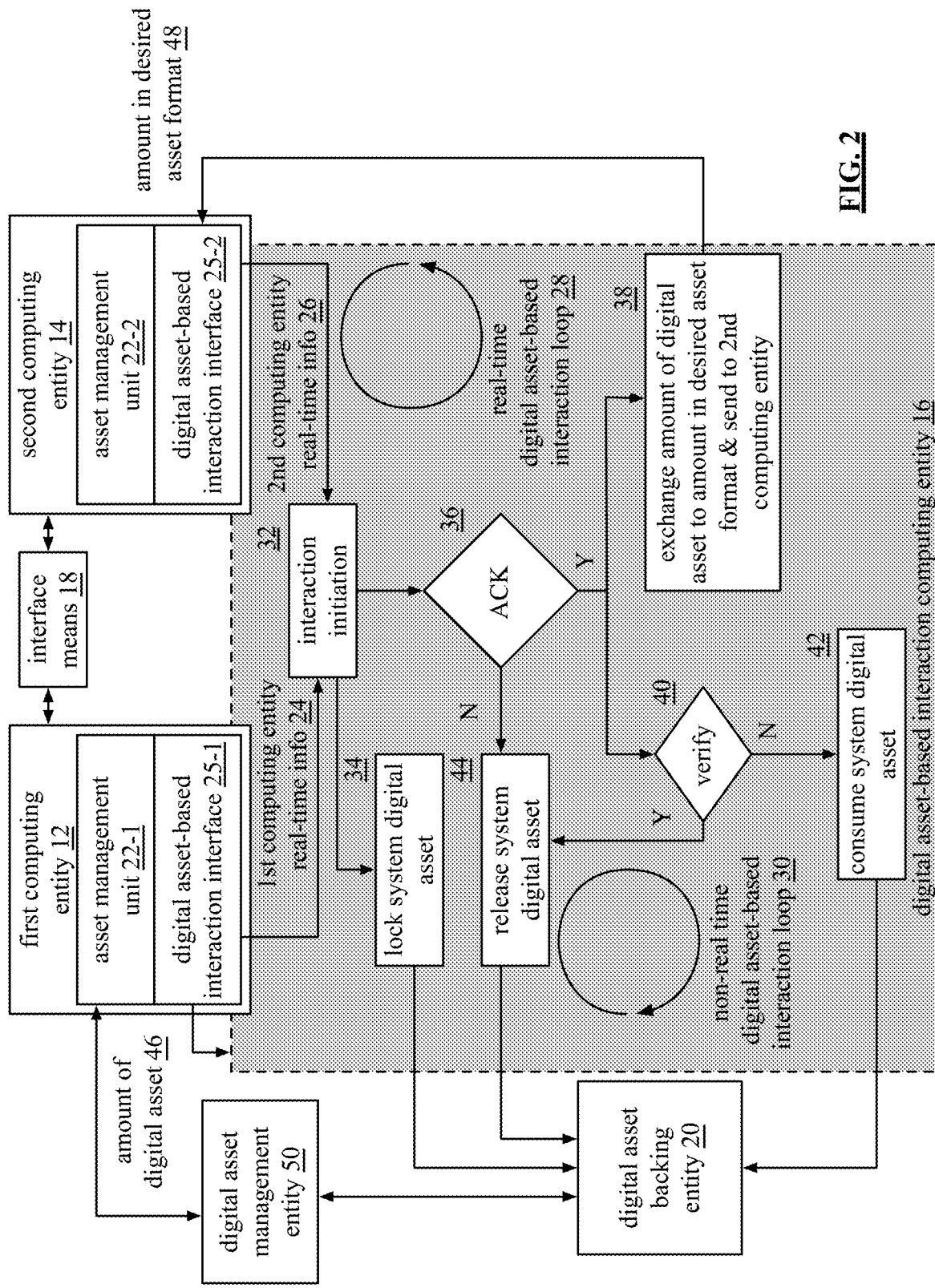
FIG. 2 is a flowchart of an example of a method for execution by a digital asset-based interaction computing entity of the digital asset-based interaction system.

FIG. 2 is a flowchart of an example of a method for execution by a digital asset-based interaction computing entity 16 of the digital asset-based interaction system 10 of FIG. 1. FIG. 2 includes a first computing entity 12, a second computing entity 14, a digital asset-based interaction computing entity 16, an interface means 18, a digital asset backing computing entity 20, and a digital asset management computing entity 50. The first and second computing entities 12 and 14 include asset management units 22-1 and 22-2 respectively and operate as discussed with reference to FIG. 1. The first and second computing entities 12 and 14 include asset management units 22-1 and 22-2 respectively that interface with the digital asset-based interaction computing entity 16 to facilitate digital asset-based interactions.

The second computing entity 14 may be a merchant computing entity that is operable to process payments from a computing entity and includes features tailored to the type of second computing entity 14 it is (e.g., a scanning device, a touchscreen, mobile payment features, online payment features, etc.).

The digital asset management computing entity 50 is associated with the digital asset backing computing entity 20 via an account and is operable to deposit system digital assets into its account to back digital asset-based interactions made by users of its associated asset management unit (e.g., asset management unit 22-1). The first computing entity 12 and the second computing entity 14 interact via the interface means 18 as discussed with reference to FIG. 1. For example, the interface means 18 is a scanning device of the first computing entity 12 and/or the second computing entity 14.

The method begins with step 32 where an interaction is initiated. An interaction is any activity involving sending digital asset-based value from the first computing entity to the second computing entity (e.g., a loan from the first computing entity to the second computing entity, a payment from the first computing entity to the second computing entity, a gift from the first computing entity to the second computing entity, etc.) where the second computing entity 14 accepts assets in a desired asset format (e.g., fiat currency or a desired digital asset that differs from the digital asset the first computing entity 12 wishes to use in the interaction) and the first computing entity provides a digital asset. An interaction is initiated when the first and second computing entities interact via the interface means 18 as discussed with reference to FIG. 1.

During the interaction initiation, the digital asset-based interaction computing entity 16 receives first computing entity real-time information 24 and second computing entity real-time information 26 regarding the digital asset-based interaction between the first computing entity 12 sending digital assets and the second computing entity 14 accepting assets in a desired asset format.

For example, the first computing entity 12 sends first computing entity real-time information 24 to the digital asset-based interaction computing entity 16 via the digital asset-based interaction interface 25-1 of the asset management unit 22 and the second computing entity 14 sends second computing entity real-time information 26 to the digital asset-based interaction computing entity 16 via the digital asset-based interaction interface 25-2 (e.g., from either requesting or scanning a scannable code). As another example, the digital asset-based interaction interface of the first computing entity 12 or the second computing entity 14 may send the first and second computing entity real-time information 24 and 26 to the digital asset-based interaction computing entity 16 (e.g., the first computing entity 12 sends the second computing entity and the first computing entity real-time information 24 and 26).

The first computing entity real-time information 24 includes an identifier (e.g., a user ID) and a type of digital asset (e.g., a cryptocurrency) it wishes to use in a real-time digital asset-based interaction with the second computing entity 14. The second computing entity real-time information 26 includes an identifier (e.g., a merchant ID) and a type of desired/selected asset format (e.g., a fiat currency, another cryptocurrency) for receiving value from the first computing entity 12. One or more of the first computing entity real-time information 24 and the second computing entity real-time information 26 includes the amount of the real-time digital asset-based interaction. The first computing entity real-time information 24 and the second computing entity real-time information 26 may include further information and/or metadata such as loyalty information, personal information (address, name, etc.), shipping details, bill splitting information, a request for additional information, etc.

When the digital asset-based interaction computing entity 16 receives the real-time information 24-26, the digital asset-based interaction computing entity 16 initiates 1) a real-time digital asset-based interaction process (e.g., the real-time digital asset-based interaction loop 28) and 2) a nonreal-time digital asset-based interaction process to reconcile the digital asset-based interaction with the digital asset backing computing entity 20 (e.g., the nonreal-time digital asset-based interaction loop 30). The reconciliation of the digital asset-based interaction with the digital asset backing computing entity 20 occurs within a time frame that is longer than the time frame of the real-time digital asset-based interaction.

The method continues with step 34 where, within the nonreal-time digital asset-based interaction loop 30, the digital asset-based interaction computing entity 16 instructs the digital asset backing computing entity 20 to lock an amount of system digital asset associated with the digital asset-based interaction. The amount of system digital asset locked may be based on one or more of an amount involved in the interaction, a type of interaction, a type of item involved in the interaction, the first computing entity 12 (e.g., a typical amount the first computing entity 12 spends, an account balance, etc.), and the second computing entity 14 (e.g., the type of merchant the second computing entity 14 is associated with, a type of goods the merchant sells, a default amount set by the merchant, etc.).

When the digital asset-based interaction computing entity 16 locks the system digital asset, a rate quote for the amount of digital asset used by the first computing entity 12 may be locked as discussed with reference to FIG. 1. The method continues with step 36 where a network acknowledgment (ACK) of the receipt of the amount of the digital asset is or is not generated. For example, when the digital asset-based interaction computing entity 16 receives an amount of digital asset 46 from the first computing entity 12 to use in the real-time digital asset-based interaction, the ACK is generated and the method continues to steps 38 and 40. If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28, the ACK is not generated, and the digital asset-based interaction terminates. Within the nonreal-time digital asset-based interaction loop 30, when the ACK is not generated, the method continues with step 44 where the digital asset-based interaction computing entity 16 instructs the digital asset backing computing entity 20 to release the amount of locked system digital asset.

Within the real-time digital asset-based interaction loop 28, when the ACK is generated, the method continues with step 38 where the digital asset-based interaction computing entity 16 exchanges (or connects to a digital asset exchange to exchange) the amount of the digital asset 46 received from the first computing entity 12 to an amount of assets in a desired asset format (e.g., fiat currency, a particular digital asset, etc.). Digital asset exchange is done quickly (e.g., 30 seconds to a few minutes) to account for exchange rate volatility. The digital asset-based interaction computing entity 16 sends the amount in the desired asset format 48 to the second computing entity 14 to complete the real-time digital asset-based interaction.

Within the nonreal-time digital asset-based interaction loop 30, when the ACK is generated at step 36, the method continues with step 40 where the digital asset-based interaction computing entity 16 verifies the amount of the digital asset 46 received from the first computing entity 12. For example, when the digital asset is cryptocurrency, the digital asset-based interaction computing entity 16 connects to a consensus network that verifies the amount of the cryptocurrency received from the first computing entity 12. The consensus network implements a verification process that may take minutes to hours of time. Other digital asset verification processes are possible and are based on the type of digital asset involved.

When the digital asset-based interaction computing entity 16 verifies the amount of the digital asset received by the first computing entity 12 at step 40, the method continues to step 44 where the digital asset-based interaction computing entity 16 instructs the digital asset backing computing entity 20 to release the amount of system digital asset locked for the digital asset-based interaction. When the digital asset-based interaction computing entity 16 does not verify the amount of the digital asset received by the first computing entity 12 at step 40, the method continues to step 42 where the digital asset-based interaction computing entity 16 instructs the digital asset backing computing entity 20 to consume the amount of system digital asset locked for the digital asset-based interaction. Consuming the amount of system digital asset means that the digital asset backing computing entity 20 transfers the amount of system digital asset to an address controlled by the digital asset-based interaction computing entity 16 in order to cover the amount of the real-time digital asset-based interaction.

Figure 2A:
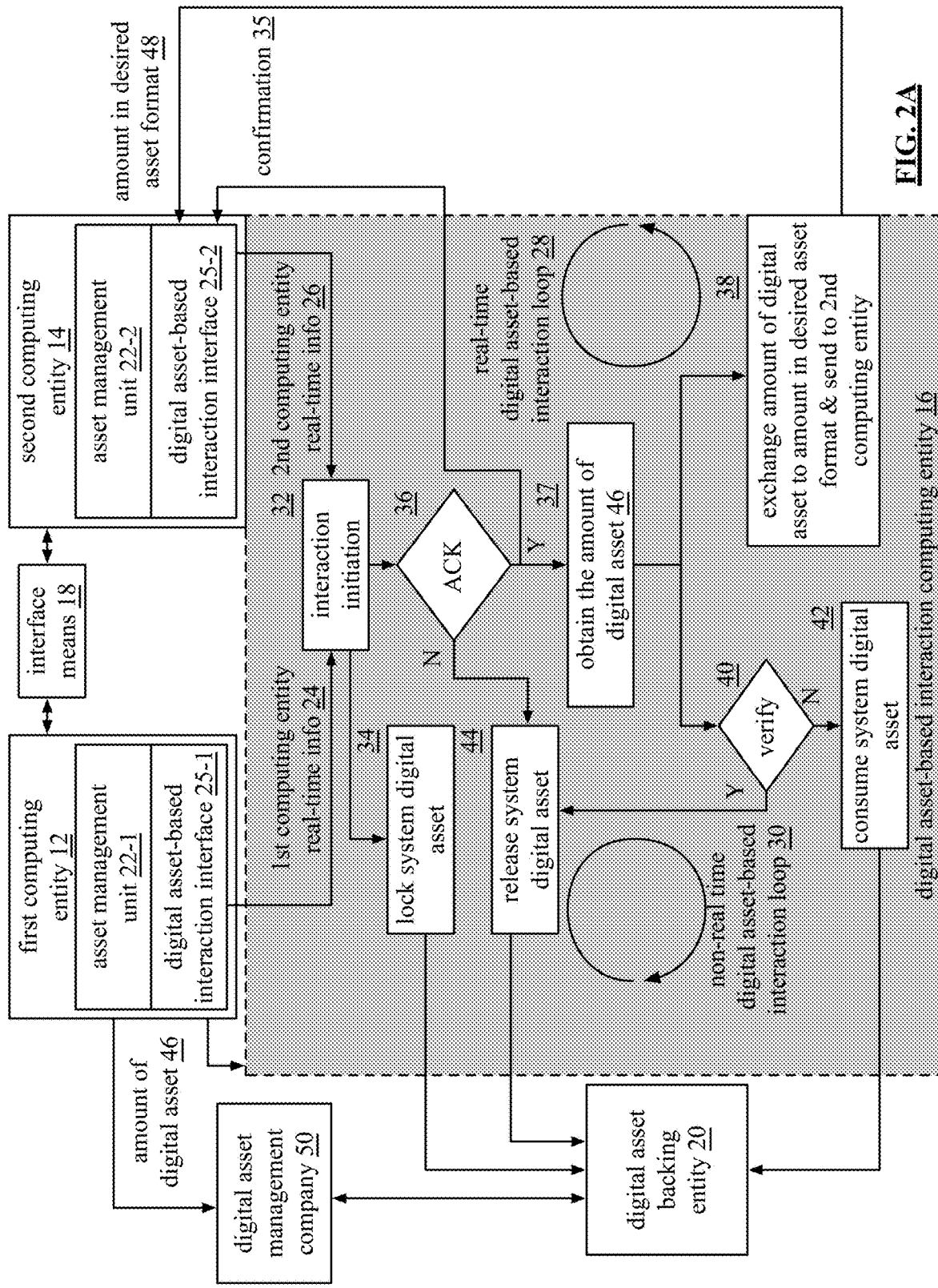
FIG. 2A is a flowchart of another example of a method for execution by a digital asset-based interaction computing entity of the digital asset-based interaction system.

FIG. 2A is a flowchart of an example of a method for execution by a digital asset-based interaction computing entity 16 of the digital asset-based interaction system 10 of FIG. 1. FIG. 2A is similar to the method of FIG. 2 except that the ACK at step 36 is generated after the system digital asset is locked but prior to receiving the amount of the digital asset from the first computing entity 12. Locking the system digital asset implies authorization of the interaction and the digital asset-based interaction computing entity 16 allows a time period (e.g., up to five minutes) prior to obtaining digital assets from the first computing entity 12 (e.g., the first computing entity has time to add tip, split the payment with another user, adjust type of digital asset used, etc.). The second computing entity 14 is provided a confirmation of this ACK. For example, when the second computing entity 14 is a POS computing device such as an attended register, this ACK may successfully end the in-person transaction such that the merchant and customer can part ways. However, the second computing entity 14 receives payment up to a few minutes after the in-person transaction.

When the digital asset-based interaction computing entity 16 locks the system digital asset, a rate quote for the amount of digital asset used by the first computing entity 12 is locked. The digital asset-based interaction computing entity 16 locks the rate quote based on a tolerance window acceptable to the user of the first computing entity 12. For example, the rate quote may be higher than a current rate quote if the window of time provided to receive funds is longer. The digital asset-based interaction computing entity 16 has knowledge of the fluctuations on the digital asset exchange used and is operable to adjust the rate quotes according to a digital asset's availability on the exchange. Further, once a user authorizes a digital asset-based interaction, the digital asset indicated in the interaction may be exchanged by the digital asset-based interaction computing entity 16 on credit (even if it has not been received yet) with the exchange to ensure a particular rate quote. Once the digital asset is received from the user, the accounting is balanced within the digital asset-based interaction computing entity 16.

As another example, the digital asset-based interaction computing entity 16 may utilize a smart contract based decentralized pool with a reserve of one or more smart contract compatible digital assets (e.g., Ethereum Request for Comment ("ERC20") tokens) for real-time digital asset exchanges to ensure a particular rate quote. For example, the digital asset-based interaction computing entity 16 exchanges smart contract compatible digital assets from the reserve (e.g., a substantial equivalent to the amount of digital asset used in the real-time digital asset-based interaction) for a substantially equivalent amount of assets in a desired asset format. When the amount of digital asset is received by the digital asset-based interaction computing entity 16, the digital asset-based interaction computing entity 16 is operable to exchange the amount of digital asset to the substantially equivalent amount of the smart contract compatible token used to cover the real-time digital asset exchange.

When the ACK is generated, the digital asset-based interaction computing entity 16 sends the second computing entity 14 a confirmation 35 of the real-time digital asset-based interaction. If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28, the ACK is not generated, and the confirmation 35 of the digital asset-based interaction is not sent.

Within the nonreal-time digital asset-based interaction loop 30, when the ACK is not generated, the method continues with step 44 where the digital asset-based interaction computing entity 16 instructs the digital asset backing computing entity 20 to release the amount of locked system digital asset. Within the real-time digital asset-based interaction loop 28, when the ACK is generated, the method continues with step 37 where, after a time period (e.g., up to 5 minutes), the amount of digital asset 46 is obtained. For example, an initial amount of digital asset is received at a time T1, and an additional amount of digital asset (e.g., tip is added) is received at a time T2 where the initial amount and the additional amount equal the amount of digital asset 46.

The method continues with step 38 where the digital asset-based interaction computing entity 16 exchanges (or connects to a digital asset exchange to exchange) the amount of the digital asset 46 received from the first computing entity 12 to an amount of asset in the desired asset format. Alternatively, if the locked system digital asset is used for the exchange, the digital asset-based interaction computing entity 16 exchanges the amount of the digital asset 46 received from the first computing entity 12 to an amount of system digital asset. The digital asset-based interaction computing entity 16 sends the amount in the desired asset format 48 to the second computing entity 14 to complete the real-time digital asset-based interaction.

Within the nonreal-time digital asset-based interaction loop 30, after the amount of digital asset 46 is obtained at step 37, the method continues with step 40 where the digital asset-based interaction computing entity 16 verifies the amount of the digital asset 46 received from the first computing entity 12. For example, the digital asset-based interaction computing entity 16 connects to a consensus network that verifies the amount of the digital asset received from the first computing entity 12. The consensus network implements a verification process that may take minutes to hours of time.

When the digital asset-based interaction computing entity 16 verifies the amount of the digital asset received by the first computing entity 12 at step 40, the method continues to step 44 where the digital asset-based interaction computing entity 16 instructs the digital asset backing computing entity 20 to release the amount of system digital asset locked for the digital asset-based interaction. When the digital asset-based interaction computing entity 16 does not verify the amount of the digital asset received by the first computing entity 12 at step 40, the method continues to step 42 where the digital asset-based interaction computing entity 16 instructs the digital asset backing computing entity 20 to consume the amount of system digital asset locked for the real-time digital asset-based interaction. Consuming the amount of system digital asset means that the digital asset backing computing entity 20 transfers the amount of system digital asset to an address controlled by the digital asset-based interaction computing entity 16 in order to cover the amount of the real-time digital asset-based interaction.

Figure 3:
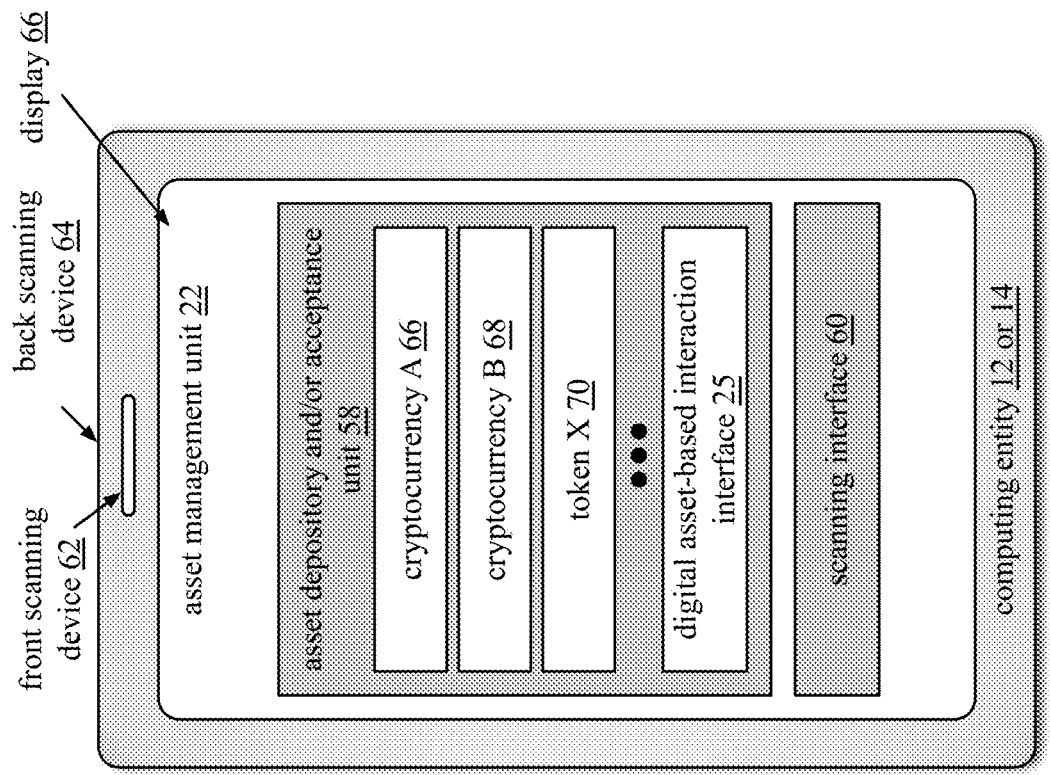
FIG. 3 is a schematic block diagram of an embodiment of a computing entity of a digital asset-based interaction system.

FIG. 3 is a schematic block diagram of an embodiment of a computing entity 12 or 14 of a digital asset-based interaction system. The computing entity 12 or 14 may be the first or second computing entity 12 or 14 of FIGS. 1-2A. The computing entity 12 or 14 includes an asset management unit 22, a display 66, a front scanning device 62 (e.g., a front camera), and a back scanning device 64 (e.g., a back camera). A scanning device may be a video device, a camera, an infrared (IR) device, a barcode scanner, etc. The computing entity 12 or 14 may have more or less scanning devices than shown. Further, the scanning devices may be located in different positions on the first computing entity 12 than what is shown. The display 66 may be a liquid crystal display (LCD), a light emitting diode (LED), and/or other type of display technology. The display 66 may include touchscreen functionality implemented by 5-wire resistive, thin film transistor (TFT), in-place switching (IPS), surface capacitive, surface acoustic wave (SAW), infrared, and/or any other type of touch sense and/or touchscreen technology.

The asset management unit 22 includes an asset depository and/or acceptance unit 58, a digital asset-based interaction interface 25, and a scanning interface 60. In this example, the asset depository and/or acceptance unit 58 is a digital wallet that stores and/or shows a representation of stored digital assets (e.g., when the digital assets are custodied by a digital asset management computing entity associated with the asset management unit 22). Here, the digital wallet stores cryptocurrency A 66, cryptocurrency B 68, and token X 70. The digital wallet could store more or less digital assets and may include additional features for digital asset management. For example, the digital wallet may include functions and/or features for trading, exchange, deposit, withdrawal, market information, digital asset news, etc. In another example, the asset depository and/or acceptance unit 58 is an interface for depositing digital assets to a network enabled smart contract.

In another example, the asset depository and/or acceptance unit 58 is POS hardware and/or software that facilitates receiving assets from other computing entities and may or may not store and/or manage digital assets. The asset depository and/or acceptance unit 58 may include a variety of existing payment processing features for processing payments within existing payment networks. When the computing entity 12 or 14 is a merchant application installed on a user device or merchant e-commerce website accessed by a user device, the asset depository and/or acceptance unit 58 may be an e-commerce platform with POS features.

The scanning interface 60 is coupled to one or more of the front and/or back scanning devices 62-64 and includes image capturing, image display, image processing, and/or encoding/decoding circuitry operable to capture, display, and/or analyze optically scanned, saved (e.g., a screenshot of a code, a code stored in a memory) or otherwise detected image data such as graphical coded representations of data (e.g., barcodes).

The digital asset-based interaction interface 25 interfaces with the digital asset-based interaction computing entity to facilitate digital asset-based interactions. The digital asset-based interaction interface 25 may be included in the asset depository and/or acceptance unit 58 as shown. For example, the asset depository and/or acceptance unit 58 is a digital wallet and a "pay" icon and/or button within the digital wallet asset depository and/or acceptance unit 58 links to the digital asset-based interaction interface 25. The digital asset-based interaction interface 25 may automatically open when the "pay" icon is selected (e.g., when the asset management unit 22 maintains an active link to the digital asset-based interaction computing entity 16) or the user of the computing entity may be prompted to sign into the digital asset-based interaction system (e.g., when the asset management unit 22 does not maintain an active link to the digital asset-based interaction computing entity 16).

As an alternative example, the digital asset-based interaction interface 25 may be included in the scanning interface 60 such that when a scan function is initiated by the scanning interface 60, the digital asset-based interaction interface 25 is accessed. A scan function may be initiated by selecting a scan icon or automatically when certain scannable codes are detected, and an automatic scan to interact function is enabled. The digital asset-based interaction interface 25 may automatically open when the scan function is initiated (e.g., when the asset management unit 22 maintains an active link to the digital asset-based interaction computing entity 16) or the user of the computing entity may be prompted to sign into the digital asset-based interaction system (e.g., when the asset management unit 22 does not maintain an active link to the digital asset-based interaction computing entity 16).

Figure 4:
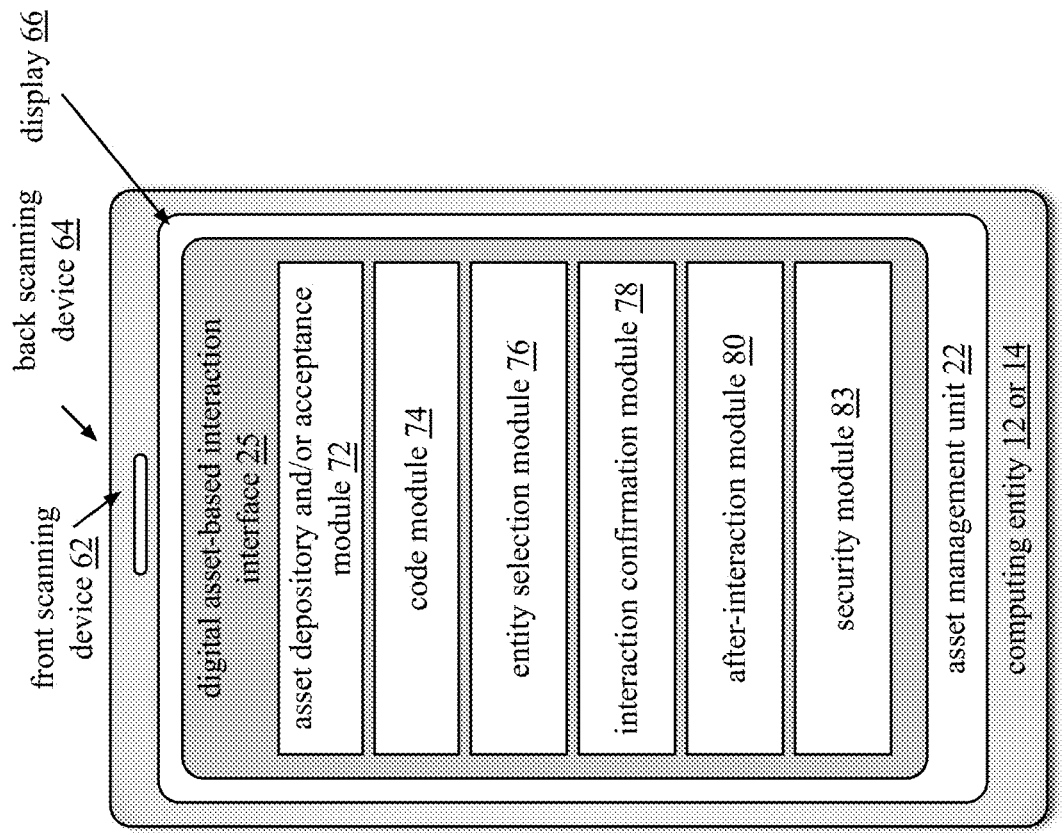
FIG. 4 is a schematic block diagram of another embodiment of a computing entity of a digital asset-based interaction system.

FIG. 4 is a schematic block diagram of an embodiment of a computing entity 12 or 14 of a digital asset-based interaction system that includes an asset management unit 22, a display 66, a front scanning device 62 (e.g., a front camera), and a back scanning device 64 (e.g., a back camera). FIG. 4 operates similarly to FIG. 3 and shows the digital asset-based interaction interface 25 of the asset management unit 22 (e.g., accessed via the asset depository and/or acceptance unit 58 or the scanning interface 60) in more detail.

FIG. 4 depicts modules of the digital asset-based interaction interface 25 that include an asset depository and/or acceptance unit module 72, a code module 74, an entity selection module 76, an interaction confirmation module 78, an after-interaction module 80, and a security module 83. More or less modules are possible. For example, the entity selection module 76 may not be necessary when the entity (e.g., merchant) selection functionality is included in other features and/or components. The asset depository and/or acceptance unit module 72 is coupled to the asset depository and/or acceptance unit of the asset management unit 22.

When the asset depository and/or acceptance unit is a digital wallet, the asset depository and/or acceptance unit module 72 displays balance information of the digital assets in the digital wallet (or a default digital asset selected for use in digital asset-based interaction system interactions) and is operable to communicate with the digital wallet to adjust digital assets (e.g., withdrawal, deposit, etc.) based on digital asset-based interaction system interactions. The balance information is based on rate quotes determined by a digital asset exchange used by the digital asset-based interaction computing entity at a point in time (e.g., a current exchange rate, an average exchange rate for a time period, etc.). The digital asset-based interaction computing entity is operable to exchange a variety of digital assets (e.g., fiat currency, cryptocurrency, etc.) and to facilitate exchange across jurisdictions (e.g., for foreign currency exchange). The balance information is updated as exchange rates fluctuate and/or based on a predetermined time (e.g., every 30 minutes, once a day, every time a user of the computing entity 12 or 14 opens digital asset-based interaction interface 25, etc.). The balance information may be shown in terms of US dollars or in any other desired digital asset.

The code module 74 is coupled to the scanning interface 60, the front scanning device 62, and/or the back scanning devices 64 of the computing entity 12 or 14 and includes software for detecting and analyzing scannable codes captured by the front and/or back scanning devices 62-64. The code module 74 is operable to receive codes (e.g., from the digital asset-based interaction computing entity), scan scannable codes (e.g., capture via the front and/or back optical scanner 62-64, digitize, and bring into a frame of reference), display scannable codes on the display 66, interpret codes to determine interaction information, and display the interaction information interpreted from the codes. The code module 74 may be a function of the scanning interface 60 that is tailored for scanning and interpreting scannable codes associated with digital asset-based interaction system interactions.

The entity selection module 76 is operable to connect to the digital asset-based interaction computing entity and/or a database associated with the digital asset-based interaction computing entity to receive digital asset-based interaction system entity data (e.g., a list of merchants and/or users associated with the digital asset-based interaction system). The entity selection module 76 may display a list of merchants and/or users that are associated with the digital asset-based interaction system for selection by the computing entity 12 or 14. The entity selection module 76 includes a search function to allow a user to search for a desired merchant and/or user. The displayed list of merchants and/or users may be based on location (e.g., nearby users and/or merchants are listed), category (e.g., restaurant merchants are listed), interaction data (e.g., users associated with a requested interaction are displayed), relationship (e.g., users that have been previously connected to and/or are authorized for contact), and/or availability (e.g., according to merchant hours of operation).

The interaction confirmation module 78 includes options for confirming an interaction and adding additional information (e.g., shipping information, bill splitting options, etc.) prior to confirming an interaction. The after-interaction module 80 includes after-interaction options that can be selected after an interaction is authorized and/or confirmed. For example, the after-interaction module 80 includes functions for an interaction adjustment (e.g., change wallets, change digital asset, etc.), adding additional information (e.g., a shipping address), bill splitting, and adding tip.

The security module 83 includes security mechanisms for authenticating the user and/or user activity of the computing entity 12 or 14 for a digital asset-based interaction. For example, the security module 83 uses facial recognition technology to perform a facial scan prior to initiating an interaction. As another example, the security module 83 stores and/or verifies usernames, passcodes, and/or keys related to authorization of digital asset-based interactions by the computing entity 12 or 14.

Figure 5:
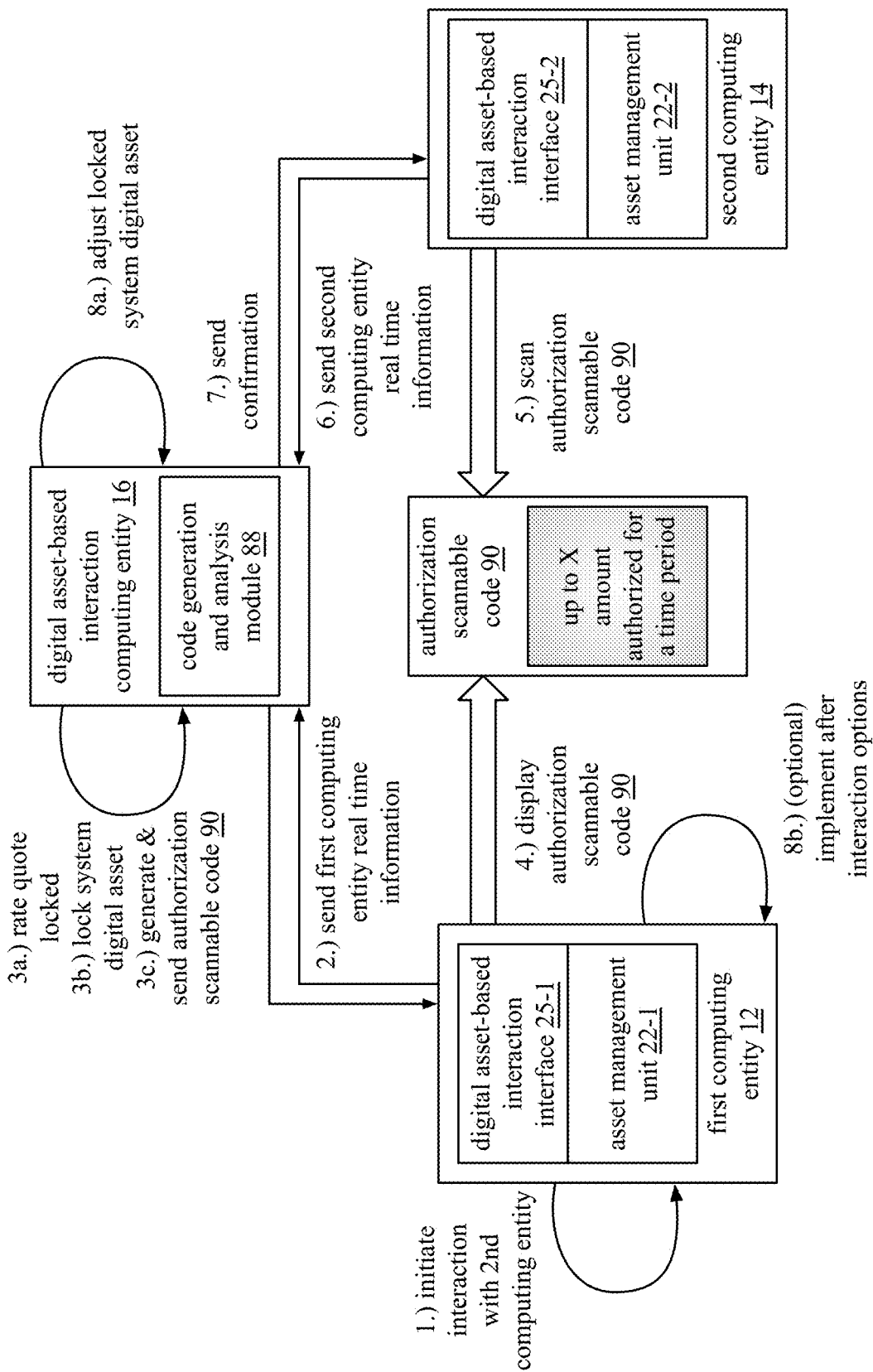
FIG. 5 is a flowchart of an example of a method for a code display interaction mode of a digital asset-based interaction system.

FIG. 5 is a flowchart of an example of a method for code display interaction mode of a digital asset-based interaction system. FIG. 5 includes the first computing entity 12, the second computing entity 14, and the digital asset-based interaction computing entity 16 of a digital asset-based interaction system. The first computing entity 12 includes an asset management unit 22-1 that includes a digital asset-based interaction interface 25-1 that interfaces with the digital asset-based interaction computing entity 16 and is coupled to one or more scanning devices.

The second computing entity 14 includes a digital asset-based interaction interface 25-2 that interfaces with the digital asset-based interaction computing entity 16. In this example, the second computing entity 14 is a merchant POS device that includes one or more scanning devices.

The digital asset-based interaction computing entity 16 includes a code generation and analysis module 88 operable to generate and send scannable codes containing digital asset-based interaction authorization information to one or more of the first computing entity 12 and the second computing entity 14. A scannable code may be a one-dimensional barcode, a two-dimensional barcode (e.g., a QR code), or any type of scannable/graphical code that can be scanned and/or read.

For a code display interaction mode, the method begins with step 1 where the first computing entity 12 initiates an interaction with the second computing entity 14. For example, the first computing entity selects to pay the second computing entity 14 via an entity selection module of the digital asset-based interaction interface 25-1. For example, a user of the first computing entity 12 is in a merchant's brick and mortar store and selects the merchant from an entity list displayed based on first computing entity GPS information (e.g., closest merchants are listed first). The method continues with step 2, where selecting the second computing entity 14 sends first computing entity real-time information to the digital asset-based interaction computing entity 16.

The first computing entity real-time information includes an identifier (e.g., a user ID) and a type of digital asset to use in a real-time digital asset-based interaction with the second computing entity 14. For example, when the first computing entity 12 selects a merchant, the user may also select a specific digital asset (e.g., Bitcoin) to use for payment. Alternatively, a preferred digital asset is stored as a default payment method. The first computing entity real-time information may include other metadata such as user loyalty information (e.g., a user's customer loyalty account number associated with the merchant), user account information associated with a merchant (e.g., username, password, etc.), personal information (e.g., address, name, etc.), shipping details, etc.

The method continues with steps 3a-3c which may occur concurrently or in a different order (e.g., step 3b occurs slightly before step 3a). In step 3a, the digital asset-based interaction computing entity 16 locks the rate quote for the digital asset selected by the first computing entity 12 such that the rate quote presented to the first computing entity 12 (via the asset management unit 22-1 balance in US dollars or other asset unit) is what is used for the real-time digital asset-based interaction even if the rate fluctuates during the interaction.

The method continues with step 3b where the digital asset-based interaction computing entity 16 locks an amount of system digital asset (e.g., that was deposited by the digital asset management computing entity associated with the asset management unit 22) as collateral for the digital asset-based interaction. The amount of system digital asset locked may be based on the first computing entity 12 (e.g., how much the first computing entity typically spends, how much digital asset the first computing entity has in the asset management unit, etc.) and/or the second computing entity 14 (e.g., what type of products the merchant sells, an average price point of items the merchant sells, a default collateral amount the merchant requires, etc.).

The method continues with step 3c where the code generation and analysis module 88 of the digital asset-based interaction computing entity 16 generates and sends an authorization scannable code 90 to the first computing entity 12. The format of the authorization scannable code 90 generated depends on the second computing entity (e.g., preference, the capabilities of POS software and/or hardware involved, etc.). For example, the authorization scannable code 90 generated depends on the scanning technology used by the second computing entity. A second computing entity may also require the digital asset-based interaction computing entity 16 generate and send a verification code along with an authorization scannable code 90.

For example, a verification code is an alpha numeric code that can be manually entered or scanned by the second computing entity 14.

If a verification code is required, the code generation and analysis module 88 generates and sends a temporary verification code along with the authorization scannable code 90 to the first computing entity 12. The authorization scannable code 90 authorizes an interaction for up to a certain amount (e.g., X amount) for a time period (e.g., 5-30 seconds). The certain amount authorized may be based on one or more of the amount of system digital asset locked, the type of digital asset involved in the interaction, the type of interaction, the first computing entity 12, the second computing entity 14, etc.

The time period may be a few seconds up to a few minutes of time depending on the first computing entity 12, the type of interaction, and/or the second computing entity 14. For example, a fast food retail payment may have a shorter time period than a car purchase payment because the car purchase may involve lengthy paperwork and identity verification checks coinciding with payment. If the time period expires prior to real-time digital asset-based interaction confirmation, the authorization scannable code 90 will no longer be valid, and the first computing entity will need to request a new authorization scannable code. Alternatively, the digital asset-based interaction computing entity 16 may automatically send a new authorization scannable code to the first computing entity 12 every few seconds for a time period (e.g., up to 5 minutes) before the first computing entity 12 would need to request a new authorization scannable code 90.

The method continues with step 4 where the first computing entity 12 displays the authorization scannable code 90 (via the code module of the digital asset-based interaction interface 25-1) on a display of the first computing entity 12. The method continues with step 5 where the second computing entity 14 is operable to scan the authorization scannable code 90 via a scanning device of the second computing entity 14. For example, a user of the first computing entity 12 places the first computing entity 12 display near a scanning device of the second computing entity 14 (e.g., the second computing entity 14 is a tablet and the scanning device is a front or back camera) for the second computing entity 14 to capture the authorization scannable code 90. In that example, the second computing entity 14 may be an unattended POS register (e.g., at a retail kiosk, self-checkout location, a gas pump checkout, a vending machine, etc.).

As another example, the second computing entity 14 is a POS register that includes a handheld scanning device (e.g., a barcode scanner, a smart phone camera, etc.). The user of the first computing entity 12 presents the authorization scannable code 90 to an attendant of the second computing entity 14, and the attendant scans the user authorization scannable code 90 with the handheld scanning device.

If user metadata is included in the authorization scannable code 90, the second computing entity 14 is operable to view that metadata upon scanning. For example, the user's loyalty information applies a discount to the total amount owed. As another example, a user's shipping information adjusts the shipping rate applied to the total amount owed. As another example, the user metadata authorizes a future and/or reoccurring charge (e.g., the merchant is a hotel and requires a payment method "on file"). In that example, the second computing entity is authorized to store limited first computing entity 12 information such that the second computing entity can send a future request for payment to the digital asset-based interaction computing entity when a future payment is due. The digital asset-based interaction computing entity receives that request from the second computing entity and generates a push notification to send to the first computing entity where the first computing entity can authorize the future payment via the push notification.

The method continues with step 6 where, when the second computing entity 14 scans the authorization scannable code 90, the second computing entity 14 sends second computing entity real-time information to the digital asset-based interaction computing entity 16. The second computing entity real-time information includes an identifier (e.g., a merchant ID) and a desired asset format (e.g., a fiat currency, a cryptocurrency, etc.) it wishes to receive assets. The second computing entity real-time information also includes the amount of the real-time digital asset-based interaction in this example. The second computing entity real-time information may include other information and/or metadata such as discounts offered and/or applied, shipping details (rates, method, etc.), bill splitting options, etc.

When the digital asset-based interaction computing entity 16 receives both the first computing entity real-time information and the second computing entity real-time information and the system digital asset has been locked for the digital asset-based interaction, the method continues with step 7 where the digital asset-based interaction computing entity 16 provides a confirmation to the second computing entity 14 that the digital asset-based interaction is approved (i.e., authorized).

The method continues with step 8a where the digital asset-based interaction computing entity 16 adjusts the amount of locked system digital asset based on the amount of the real-time digital asset-based interaction. The authorization scannable code 90 implies authorization of the interaction, but funds are not necessarily pulled from the first computing entity 12 for a time period. As such, the method continues with an optional step 8b where the first computing entity 12 has a certain amount of time (a few seconds to up to five minutes) to implement after-interaction options. The after-interaction options include switching between asset management units, switching the type of digital asset used, adding a tip, splitting the bill, moving items for purchase between users, etc. Further, because digital assets are not obtained immediately, if a network connection issue occurs (e.g., internet connection is lost for a few seconds) after interaction confirmation, funds can be pulled when the network connection is reestablished. The method continues with steps similar to steps 36-44 of FIGS. 2 and 2A.

Figure 6:
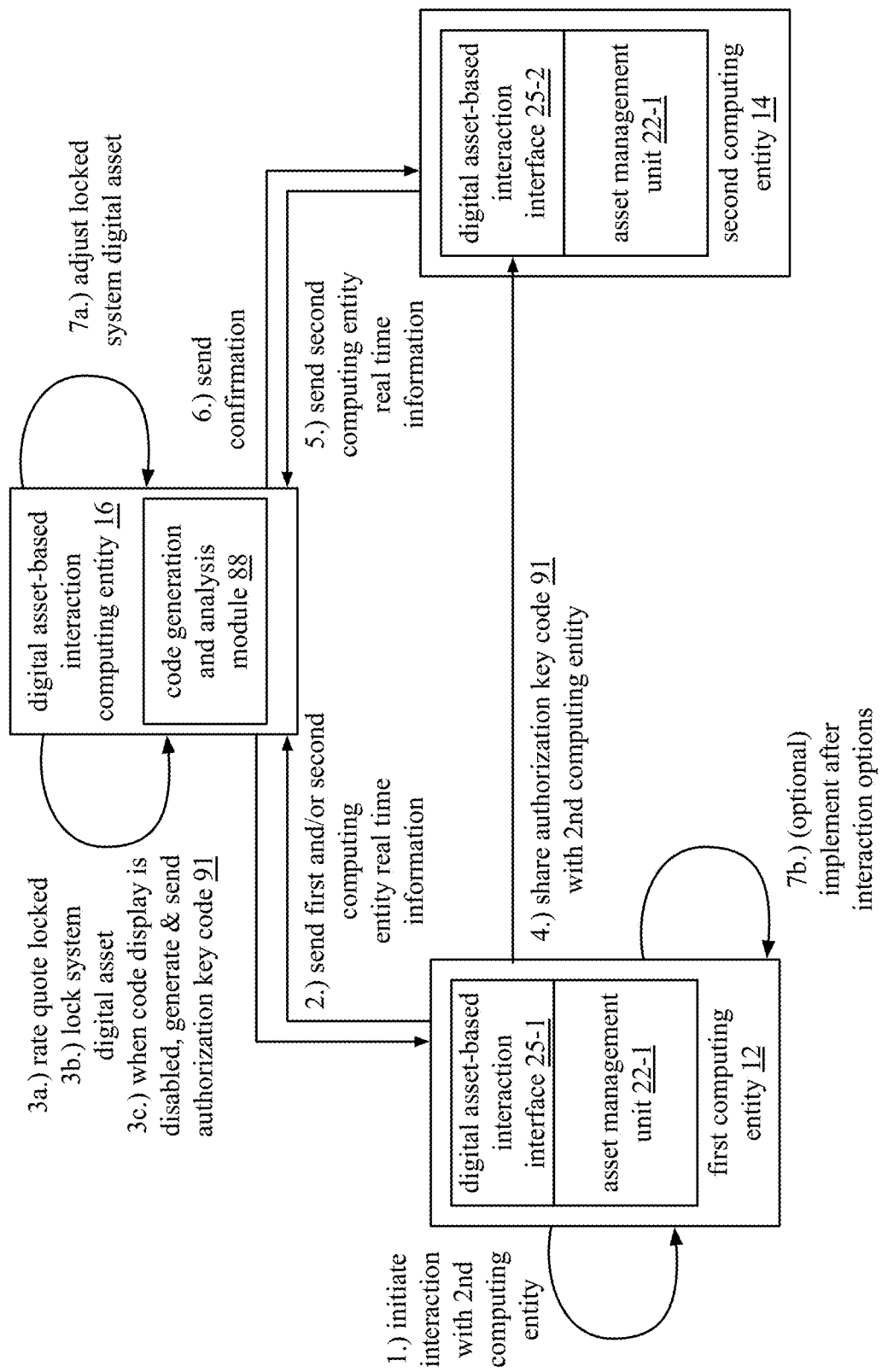
FIG. 6 is a flowchart of an example of a method for a key code share interaction mode of a digital asset-based interaction system.

FIG. 6 is a flowchart of an example of a method for a key code share interaction mode of a digital asset-based interaction system. FIG. 6 includes the first computing entity 12, the second computing entity 14, and the digital asset-based interaction computing entity 16 of a digital asset-based interaction system. The method of FIG. 6 operates similarly to the method of FIG. 5 except that a code display mode is disabled (e.g., the display of the first and/or second computing entity is cracked, the scanning device of the first and/or second computing entity is inoperable, a scannable code is not preferred, a key code is preferred, etc.), therefore; instead of the first computing entity displaying an authorization scannable code for the interaction, the first computing entity 12 is operable to share a unique authorization key code with the second computing entity 14 to authorize a digital asset-based interaction.

The method begins with step 1 where the first computing entity 12 initiates an interaction with the second computing entity 14. For example, the first computing entity selects to pay the second computing entity 14 via an entity selection module of the digital asset-based interaction interface 25-1. For example, a user of the first computing entity 12 is in a merchant's brick and mortar store and selects the merchant from an entity list displayed within the entity selection module of the digital asset-based interaction interface 25-1 based on first computing entity GPS information (e.g., closest merchants are listed first, etc.).

The method continues with step 2, where initiating the interaction with the second computing entity 14, sends first and/or second computing entity real-time information to the digital asset-based interaction computing entity 16. The first computing entity real-time information includes an identifier (e.g., a user ID) and a type of digital asset to use in a real-time digital asset-based interaction with the second computing entity 14. For example, when the first computing entity 12 selects a merchant, the user may also select a specific digital asset (e.g., Bitcoin) to use for payment. Alternatively, a preferred digital asset is stored as a default payment method. The first and/or second computing entity real-time information may also include an identifier of the second computing entity (e.g., a merchant ID) and/or other second computing entity information the first computing entity obtained by initiating the interaction. The first computing entity real-time information may include other metadata such as user loyalty information (e.g., a user's customer loyalty account number associated with the merchant), user account information associated with a merchant (e.g., username, password, etc.), personal information (e.g., address, name, etc.), shipping details, etc.

The method continues with steps 3a-3c which may occur concurrently or in a different order (e.g., step 3b occurs slightly before step 3a). In step 3a, the digital asset-based interaction computing entity 16 locks the rate quote for the digital asset selected by the first computing entity 12 such that the rate quote presented to the first computing entity 12 (via the asset management unit 22-1 balance in US dollars or other digital asset) is what is used for the real-time digital asset-based interaction even if the rate fluctuates during the interaction.

The method continues with step 3b where the digital asset-based interaction computing entity 16 locks an amount of system digital asset (e.g., that was deposited by the digital asset management computing entity associated with the asset management unit 22) as collateral for the real-time digital asset-based interaction. The amount of system digital asset locked may be based on the first computing entity 12 (e.g., how much the first computing entity typically spends, how much digital asset the first computing entity has in the asset management unit, etc.) and/or the second computing entity 14 (e.g., what type of products the merchant sells, an average price point of items the merchant sells, a default collateral amount the merchant requires, etc.).

The method continues with step 3c where, when a code display interaction mode of the first computing device is disabled, the code generation and analysis module 88 of the digital asset-based interaction computing entity 16 generates and sends an authorization key code 91 to the first computing entity 12. The code display interaction mode may be considered disabled based on a request by the first computing entity 12 (e.g., an indication included in the first computing entity real-time information, a received request, etc.), an indication that the second computing device 14 is unable to scan scannable codes, a default setting (e.g., of one or more of the first computing entity 12, the second computing device 14, and the digital asset-based interaction computing entity 16), a preference (e.g., of one or more of the first computing entity 12, the second computing device 14, and the digital asset-based interaction computing entity 16) an indication that an attempt to display a scannable code by the first computing entity 12 failed, and/or an indication that an attempt to scan a code by the second computing entity has failed, etc.

The authorization key code 91 is a numerical, alphanumeric, or any type of code that does not require optical scanning for code capturing that authorizes an interaction for up to a certain amount (e.g., X amount) for a time period (e.g., 5-30 seconds). The authorization key code 91 may include a timestamp and may include at least a portion of the first computing entity real time information (e.g., user loyalty information). The certain amount authorized may be based on one or more of the amount of system digital asset locked, the type of digital asset involved, the type of interaction, the first computing entity 12, the second computing entity 14, etc.

The time period may be a few seconds up to a few minutes of time depending on the first computing entity 12, the type of interaction, and/or the second computing entity 14. For example, a fast food retail payment may have a shorter time period than a car purchase payment because the car purchase may involve lengthy paperwork and identity verification checks coinciding with payment. If the time period expires prior to real-time digital asset-based interaction confirmation, the authorization key code 91 will no longer be valid and the first computing entity will need to request a new authorization key code. Alternatively, the authorization key code 91 may be a dynamic personal identification number (PIN) associated with the interaction that is regenerated every few seconds such that the digital asset-based interaction computing entity 16 automatically sends a new authorization key code 91 to the first computing entity 12 every few seconds for a time period (e.g., up to 5 minutes).

The method continues with step 4 where the first computing entity 12 shares the authorization key code 91 with the second computing entity 14 (e.g., the first computing entity 12 inputs the code on a keypad or touchscreen of the second computing entity 14, the first computing entity 12 inputs the code on the digital asset-based interaction interface 25-1, the first computing entity 12 inputs the code within a merchant app and/or ecommerce website associated with the second computing entity 14, the first computing entity 12 displays the authorization key code 91 where a user of the second computing entity 14 is operable to input the authorization key code 91 into the second computing entity 14, etc.).

If user metadata is included in the authorization key code 91, the second computing entity 14 is operable to view that metadata upon entry of the authentication key code 91. For example, the user's loyalty information applies a discount to the total amount owed. As another example, a user's shipping information adjusts the shipping rate applied to the total amount owed. As another example, the user metadata authorizes a future and/or reoccurring charge (e.g., the merchant is a hotel and requires a payment method "on file"). In that example, the second computing entity is authorized to store limited first computing entity 12 information such that the second computing entity can send a future request for payment to the digital asset-based interaction computing entity when a future payment is due. The digital asset-based interaction computing entity receives that request from the second computing entity and generates a push notification to send to the first computing entity where the first computing entity can authorize the future payment via the push notification.

The method continues with step 5 where, when the second computing entity 14 receives and interprets the authorization key code 91, the second computing entity 14 sends second computing entity real-time information to the digital asset-based interaction computing entity 16. The second computing entity real-time information includes an identifier (e.g., a merchant ID) and a desired asset format (e.g., a fiat currency, a cryptocurrency, etc.) it wishes to and/or is able to receive assets. The second computing entity real-time information also includes the amount of the real-time digital asset-based interaction in this example. The second computing entity real-time information may include other information and/or metadata such as discounts offered and/or applied, shipping details (rates, method, etc.), bill splitting options, etc.

When the digital asset-based interaction computing entity 16 receives both the first computing entity real-time information and the second computing entity real-time information and the system digital asset has been locked for the digital asset-based interaction, the method continues with step 6 where the digital asset-based interaction computing entity 16 provides a confirmation to the second computing entity 14 that the digital asset-based interaction is approved (i.e., authorized).

The method continues with step 7a where the digital asset-based interaction computing entity 16 adjusts the amount of locked system digital asset based on the amount of the real-time digital asset-based interaction. The authorization key code 91 implies authorization of the interaction, but funds are not necessarily pulled from the first computing entity 12 for a time period. As such, the method continues with an optional step 7b where the first computing entity 12 has a certain amount of time (a few seconds to up to five minutes) to implement after-interaction options. The after-interaction options include switching between asset management units, switching the type of digital asset used, adding a tip, splitting the bill, moving items for purchase between users, etc. Further, because digital assets are not obtained immediately, if a network connection issue occurs (e.g., internet connection is lost for a few seconds) after interaction confirmation, funds can be pulled when the network connection is reestablished. The method continues with steps similar to steps 36-44 of FIGS. 2 and 2A.

Figure 7:
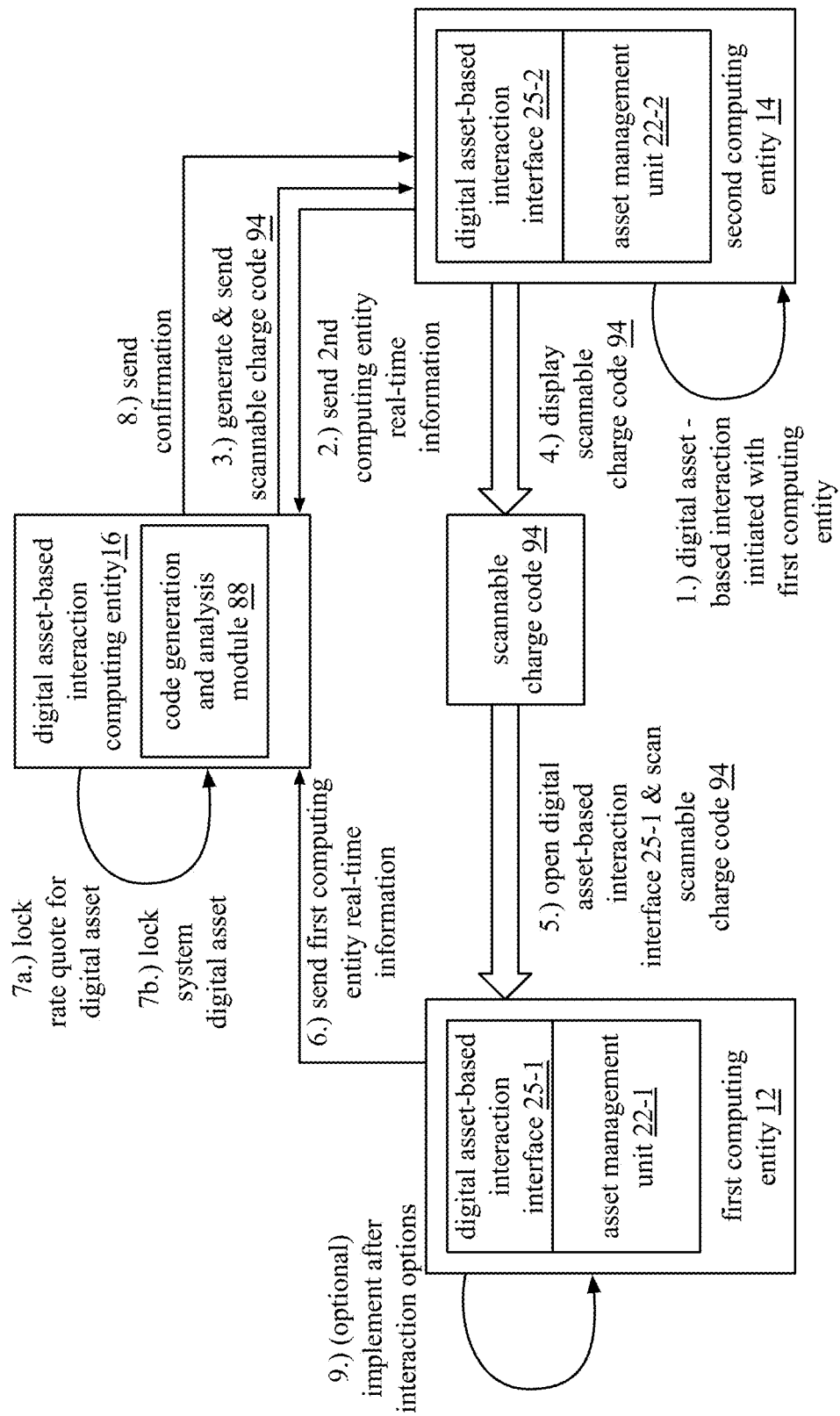
FIG. 7 is a schematic block diagram of an embodiment of a code scan interaction mode of a digital asset-based interaction system.

FIG. 7 is a flowchart of an example of a method for a code scan interaction mode of the digital asset-based interaction system. FIG. 7 includes the first computing entity 12, the second computing entity 14, and the digital asset-based interaction computing entity 16 of a digital asset-based interaction system. The first computing entity 12 includes an asset management unit 22-1 including a digital asset-based interaction interface 25-1 that interfaces with the digital asset-based interaction computing entity 16 and is coupled to one or more scanning devices.

The second computing entity 14 includes a digital asset-based interaction interface 25-2 that interfaces with the digital asset-based interaction computing entity 16. In this example, the second computing entity 14 may be any type of a second computing entity 14 such as a merchant POS device, an e-commerce website, an e-commerce mobile application, etc.

The digital asset-based interaction computing entity 16 includes a code generation and analysis module 88 operable to generate and send scannable codes containing digital asset-based interaction authorization information to one or more of the first computing entity 12 and the second computing entity 14. A scannable code may be a one-dimensional barcode, a two-dimensional barcode (e.g., a QR code), or any type of graphical code that can be optically scanned and/or read.

For a code scan interaction mode, the method begins with step 1 where a digital asset-based interaction is initiated with the first computing entity 12 by the second computing entity 14. For example, the second computing entity 14 is a POS register and one or more of the first computing entity 12 and the second computing entity 14 select a digital asset-based payment option during checkout. As another example, the second computing entity 14 is an e-commerce website, and a user of the first computing entity 12 selects a digital asset-based payment option on a checkout page of the e-commerce website.

The method continues with step 2 where, when the digital asset-based interaction is initiated with the first computing entity 12, the second computing entity 14 sends second computing entity real-time information to the digital asset-based interaction computing entity 16. The second computing entity real-time information includes an identifier (e.g., a merchant ID) and a desired asset format (e.g., a fiat currency, a digital asset, etc.) it wishes to receive assets. The second computing entity real-time information also includes the amount of the real-time digital asset-based interaction in this example. The second computing entity real-time information may include other information and/or metadata such as discounts offered and/or applied, shipping details (rates, method, etc.), bill splitting options, a request for first computing entity information, etc.

The method continues with step 3 where the code generation and analysis module 88 of the digital asset-based interaction computing entity 16 generates and sends a scannable charge code 94 to the second computing entity 14. The scannable charge code 94 includes a transaction and/or terminal identifier (ID) of the second computing entity 14, second computing entity information (e.g., a merchant ID, merchant name, etc.) the amount of the interaction, the asset format requested, and other metadata. For example, scannable charge code 94 metadata includes a request for customer loyalty information, for shipping details (e.g., method, customer address), a discount applied (e.g., according to certain conditions such as when a certain digital asset is used), etc.

The method continues with step 4 where the second computing entity 14 displays the scannable charge code 94. For example, the second computing entity 14 is a POS register and displays the scannable charge code 94 on a display of the POS register. As another example, the second computing entity 14 is a POS register and prints the scannable charge code 94 onto a receipt. As another example, the second computing entity 14 is an e-commerce website that presents the scannable charge code 94 on the checkout page of the e-commerce website.

The method continues with step 5 where the first computing entity 12 opens a digital asset-based interaction interface 25-1 on a selected asset management unit 22-1 and scans the scannable charge code 94 via a scanning device of the first computing entity 12. For example, the scanning device of the first computing entity 12 scans the scannable charge code 94 presented on a display of the second computing entity 14 (e.g., the second computing entity 14 is a POS register). As another example, the scanning device of the first computing entity 12 scans the scannable charge code 94 presented on a receipt of the second computing entity 14 (e.g., the second computing entity 14 is a POS register that printed the scannable charge code 94 onto a receipt).

As another example, the user of the first computing entity 12 uses another first computing entity (e.g., a laptop or desktop computer) to access an e-commerce website. The scannable charge code 94 is presented on a checkout page on the e-commerce website where the scanning device of the first computing entity 12 is operable to scan the scannable charge code 94.

The code module interprets the scanned scannable charge code 94 and may display second computing entity requests included in the scannable charge code information to the first computing entity 12 such as a request for a shipping address and shipping method, a request for customer loyalty information, discount information, etc.

The method continues with step 6, where scanning the scannable charge code 94 sends first computing entity real-time information to the digital asset-based interaction computing entity 16. The first computing entity real-time information includes an identifier (e.g., a user ID) and a type of digital asset to use in a real-time digital asset-based interaction with the second computing entity 14.

When second computing entity requests are displayed to the first computing entity 12, the first computing entity real-time information may further include user inputs in response to those requests (e.g., the first computing entity 12 enters in customer loyalty information, shipping details, etc.).

The method continues with steps 7a-7b which may occur concurrently or in a different order (e.g., step 7b occurs slightly before step 7a). In step 7a, the digital asset-based interaction computing entity 16 locks the rate quote for the digital asset selected by the first computing entity 12 such that the rate quote presented to the first computing entity 12 (via the digital asset balance in US dollars or other asset unit) is what is used for the interaction even if the rate fluctuates during that time.

The method continues with step 7b where the digital asset-based interaction computing entity 16 locks an amount of system digital asset (e.g., that was deposited by the digital asset management computing entity associated with the asset management unit 22-1) as collateral for the digital asset-based interaction. The amount of system digital asset locked may be based on the first computing entity 12 (e.g., how much the first computing entity typically spends, how much digital asset the first computing entity has in the asset management unit, etc.) and/or the merchant computing 14 (e.g., what type of products the merchant sells, an average price point of items the merchant sells, a default collateral amount the merchant requires, etc.). In this example, the amount of the interaction is known, therefore the amount of the system digital asset locked is based on that amount.

When the digital asset-based interaction computing entity 16 receives both the first computing entity real-time information and the second computing entity real-time information and the system digital asset has been locked for the digital asset-based interaction, the method continues with step 8 where the digital asset-based interaction computing entity 16 provides a confirmation to the second computing entity 14 that the digital asset-based interaction is approved (i.e., authorizes).

The scannable charge code 94 implies authorization of payment to the second computing entity 14 but funds are not necessarily pulled from the first computing entity 12 for a few seconds or more. As such, the method continues with an optional step 9 where the first computing entity 12 has a time period (e.g., a few second or more) to implement after-interaction options (e.g., switch between asset management units, switch the type of digital asset used, etc.). The method continues with steps similar to steps 36-44 of FIGS. 2 and 2A.

Figure 8:
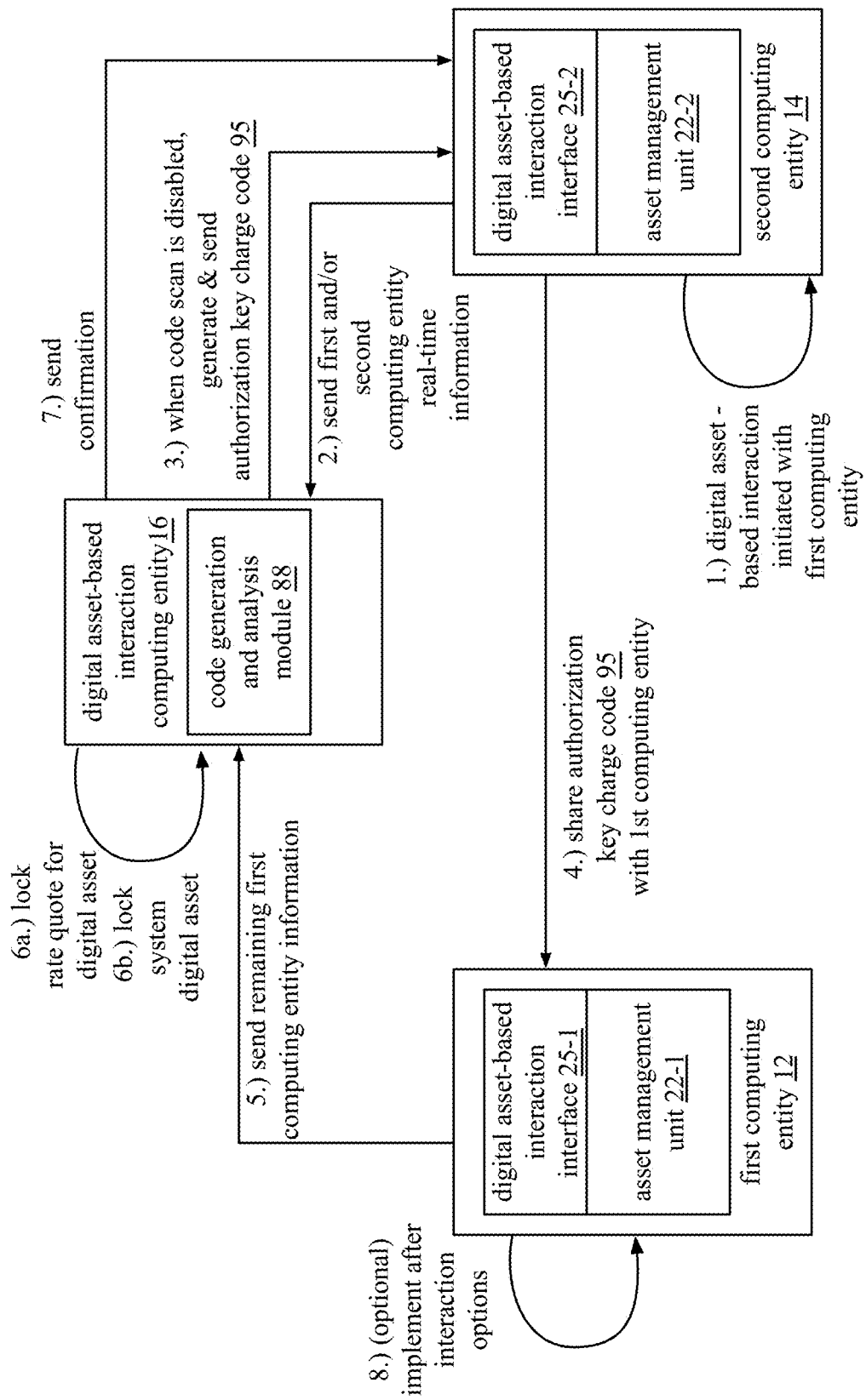
FIG. 8 is a flowchart of an example of a method for a key code entry interaction mode of a digital asset-based interaction system.

FIG. 8 is a flowchart of an example of a method for a key code entry interaction mode of a digital asset-based interaction system. FIG. 8 includes the first computing entity 12, the second computing entity 14, and the digital asset-based interaction computing entity 16 of a digital asset-based interaction system. The method of FIG. 8 operates similarly to the method of FIG. 7 except that a code scan interaction mode is disabled (e.g., the scanning device of the first computing entity is inoperable, the display of the second computing entity is cracked and/or inoperable, a scannable code is not preferred, etc.), therefore; instead of scanning a scannable charge code for the interaction, the second computing entity 14 is operable to share a unique authorization key charge code with the first computing entity 12 to authorize a real-time digital asset-based interaction.

The method begins with step 1 where a digital asset-based interaction is initiated with the first computing entity 12 by the first and/or second computing entity 14. For example, the second computing entity 14 is a POS register and one or more of the first computing entity 12 and the second computing entity 14 select a digital asset-based payment option during checkout. As another example, the second computing entity 14 is an e-commerce website, and a user of the first computing entity 12 selects a digital asset-based payment option on a checkout page of the e-commerce website.

The method continues with step 2 where, when the digital asset-based interaction is initiated with the first computing entity 12, the second computing entity 14 sends first and/or second computing entity real-time information to the digital asset-based interaction computing entity 16. The first and/or second computing entity real-time information includes an identifier of the first and second computing entities (e.g., a user ID, a merchant ID, etc.) and a desired asset format (e.g., a fiat currency, a digital asset, etc.) the second computing entity wishes to receive assets. The first and/or second computing entity real-time information also includes the amount of the real-time digital asset-based interaction in this example. The first and/or second computing entity real-time information may include other information and/or metadata such as discounts offered and/or applied, shipping details (rates, method, etc.), bill splitting options, a request for first computing entity information, etc.

The method continues with step 3 where, when the code scan interaction mode is disabled, the code generation and analysis module 88 of the digital asset-based interaction computing entity 16 generates and sends an authorization key charge code 95 to the second computing entity 14. The code scan interaction mode may be considered disabled based on a request by the second computing entity 14 (e.g., as indicated in the second and/or first computing entity real-time information, a request received from the second computing entity 14, etc.), an indication that the first computing device 12 is unable to scan scannable codes, a default setting (e.g., of one or more of the first computing entity 12, the second computing device 14, and the digital asset-based interaction computing entity 16), a preference (e.g., of one or more of the first computing entity 12, the second computing device 14, and the digital asset-based interaction computing entity 16), an indication that an attempt to display a scannable code by the second computing entity 14 failed, and/or an indication that an attempt to scan a code by the first computing entity has failed, etc.

The authorization key charge code 95 is a numerical, alpha-numeric, or any type of code that does not require optical scanning for code capturing. The authorization key charge code 95 may be time stamped and includes a transaction and/or terminal identifier (ID) of the second computing entity 14, second computing entity information (e.g., a merchant ID, merchant name, etc.) the amount of the interaction, and the asset format requested. The authorization key charge code 95 may be a dynamic personal identification number (PIN) associated with the interaction that is regenerated every few seconds. The authorization key charge code 95 may include additional metadata such as a request for customer loyalty information, a request for shipping details (e.g., method, customer address), a discount applied (e.g., according to certain conditions such as when a certain digital asset is used), etc.

The method continues with step 4, where the second computing entity 14 shares the authorization key charge code 95 with the first computing entity 12. For example, the second computing entity 14 displays the authorization key charge code 95 and a user of the first computing entity 12 is operable to input the authorization key charge code 95 into the digital asset-based interaction interface 25-1. As another example, the authorization key charge code 95 is shared via an interface means (e.g., NFC, Bluetooth, etc.).

By entering in the authorization key charge code 95 into a digital asset-based interaction interface 25-1 field, the method continues with step 5 where the first computing entity 12 authorizes the interaction and sends remaining first computing entity real-time information to the digital asset-based interaction computing entity 16. The remaining first computing entity real-time information includes a type of digital asset to use in a real-time digital asset-based interaction with the second computing entity 14. The code module of the first computing entity interprets the authorization key charge code 95 and may display second computing entity requests included in the authorization key charge code 95 information to the first computing entity 12 such as a request for a shipping address and shipping method, a request for customer loyalty information, discount information, etc.

When second computing entity requests are displayed to the first computing entity 12, the first computing entity real-time information may further include user inputs in response to those requests (e.g., the first computing entity 12 enters in customer loyalty information, shipping details, etc.).

The method continues with steps 6a-6b which may occur concurrently or in a different order (e.g., step 6b occurs slightly before step 6a). In step 6a, the digital asset-based interaction computing entity 16 locks the rate quote for the digital asset selected by the first computing entity 12 such that the rate quote presented to the first computing entity 12 (via the digital asset balance in US dollars or other asset unit) is what is used for the interaction even if the rate fluctuates during that time.

The method continues with step 6b where the digital asset-based interaction computing entity 16 locks an amount of system digital asset (e.g., that was deposited by the digital asset management computing entity associated with the asset management unit 22-1) as collateral for the digital asset-based interaction. The amount of system digital asset locked may be based on the first computing entity 12 (e.g., how much the first computing entity typically spends, how much digital asset the first computing entity has in the asset management unit, etc.) and/or the second computing entity 14 (e.g., what type of products the second computing entity sells, an average price point of items the second computing entity sells, a default collateral amount the second computing entity requires, etc.). In this example, the amount of the interaction is known, therefore the amount of the system digital asset locked is based on that amount.

When the digital asset-based interaction computing entity 16 receives both the first computing entity real-time information and the second computing entity real-time information and the system digital asset has been locked for the interaction, the method continues with step 7 where the digital asset-based interaction computing entity 16 provides a confirmation to the second computing entity 14 that the real-time digital asset-based interaction is approved (i.e., authorized).

The authorization key charge code 95 implies authorization of the interaction with the second computing entity 14 but digital assets are not necessarily pulled from the first computing entity 12 for a few seconds or more. As such, the method continues with an optional step 8 where the first computing entity 12 has a time period (e.g., a few second or more) to implement after-interaction options (e.g., switch between asset management units, switch the type of digital asset used, etc.). The method continues with steps similar to steps 36-44 of FIGS. 2 and 2A.

Figure 9:
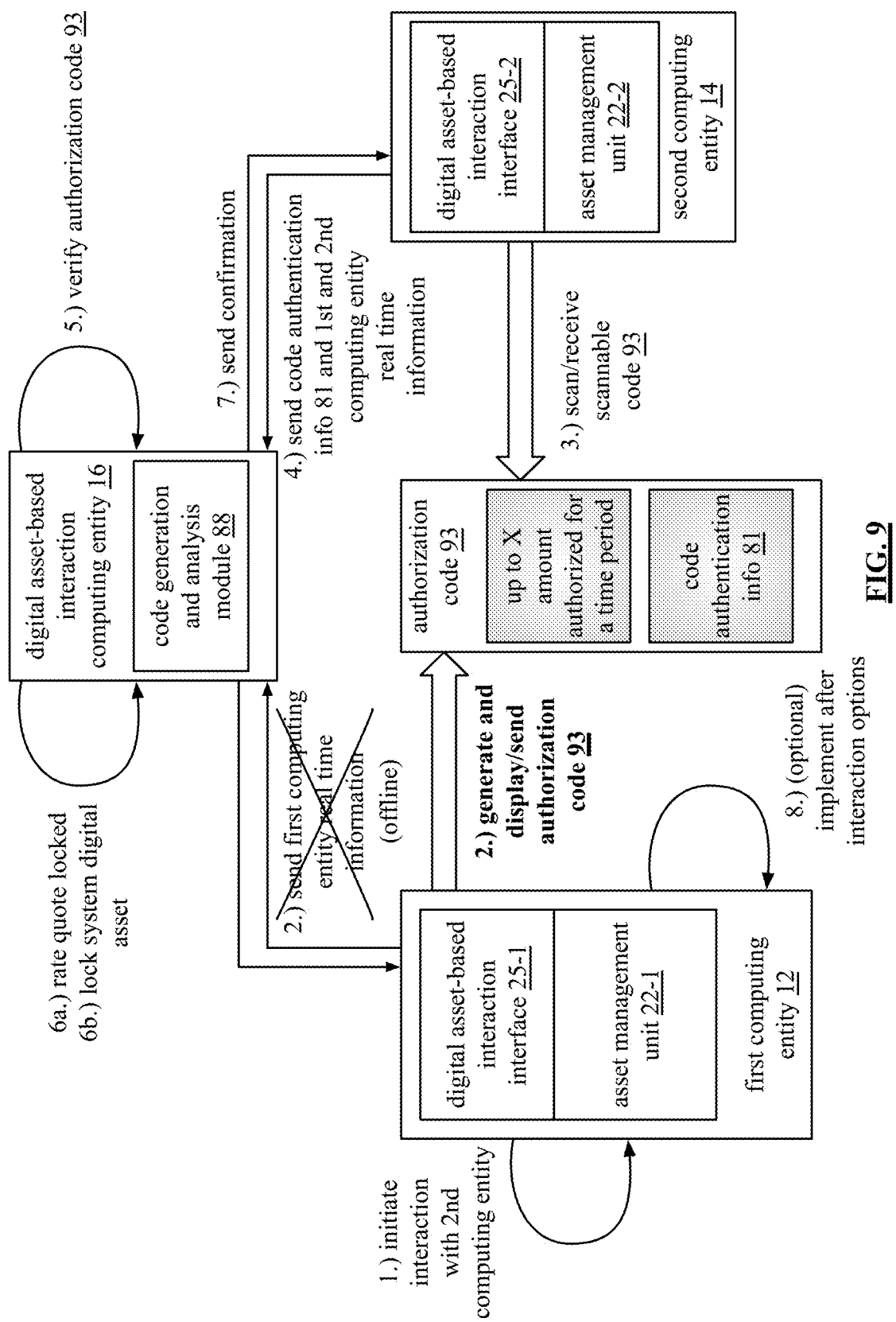
FIG. 9 is a flowchart of an example of a method for an offline interaction mode of a digital asset-based interaction system.

FIG. 9 is a flowchart of an example of a method for an offline interaction mode of a digital asset-based interaction system. FIG. 9 includes the first computing entity 12, the second computing entity 14, and the digital asset-based interaction computing entity 16 of a digital asset-based interaction system. The offline interaction mode of FIG. 9 operates similarly to the code display interaction mode of FIG. 5 except that a connection between the first computing entity 12 and the digital asset-based interaction computing entity 16 is unavailable (e.g., a network connection is lost, the first computing device is in airplane mode, the digital asset-based interaction computing entity 16 goes offline, etc.) when a digital asset-based interaction is initiated and/or during a digital asset-based interaction initiation. Further, the authorization code 93 may be a scannable code and/or key code.

The method begins with step 1 where the first computing entity 12 initiates an interaction with the second computing entity 14. The initiation of the interaction may be made prior to the connection becoming unavailable or while the connection is unavailable. For example, the first computing entity selects to pay the second computing entity 14 via an entity selection module of the digital asset-based interaction interface 25-1 (e.g., based on first computing entity GPS information where closest merchants are listed first, by merchant search, etc.).

When a connection between the first computing entity 12 and the digital asset-based interaction computing entity 16 is available, initiating the digital asset-based interaction sends first computing entity real-time information to the digital asset-based interaction computing entity 16. However, if the connection is unavailable (e.g., the first computing entity 12 is offline), the method continues with step 2 where the first computing entity generates an authorization code 93 and displays the authorization code 93 and/or sends the authorization code 93 to the second computing entity 14 (e.g., via an interface means).

The authorization code 93 may be a scannable code (e.g., a QR code), an authorization key code, a time-based one-time passcode, and/or any type of format for coded information. The authorization code 93 includes first computing entity real-time information such as an identifier (e.g., a user ID) and a type of digital asset to use in a real-time digital asset-based interaction with the second computing entity 14. For example, when the first computing entity 12 selects a merchant, the user may also select a specific digital asset (e.g., Bitcoin) to use for the interaction. Alternatively, a preferred digital asset is stored as a default payment method. The first computing entity real-time information may include other metadata such as user loyalty information (e.g., a user's customer loyalty account number associated with the merchant), user account information associated with a merchant (e.g., username, password, etc.), personal information (e.g., address, name, etc.), shipping details, etc. The authorization code 93 may authorize a certain amount for the interaction (e.g., up to X amount) and include a time period (e.g., an expiration time to use the authorization code 93).

The authorization code 93 includes code authentication information 81. The code authentication information 81 allows the digital asset-based interaction computing entity to verify that an authorization code 93 code is authentic (e.g., it is from an authorized user and/or device) even though it is not received from the first computing entity 12. The code authentication information 81 includes at least a portion of authentication data (e.g., a public/private key pair, username and and/or password, digital signatures, timestamp, etc.) and/or data affected by at least a portion of authentication data (e.g., the authorization code 93 is encoded with a private key where the private key is the at least a portion of authentication data).

For example, at a time prior to the interaction and/or or the connection becoming unavailable (e.g., at installation of the asset management unit 22-1, upon anticipation of the connection becoming unavailable, etc.), the first computing entity 12 shares authentication data with the digital asset-based interaction computing entity 16. For example, the first computing entity 12 generates authentication data (e.g., a public/private key pair, username and and/or password, digital signatures, etc.), stores at least a portion of the authentication data (e.g., the public/private key pair, the private key, etc.), and sends at least a portion of the authentication data (e.g., the public key of the public/private key pair) to the digital asset-based interaction computing entity 16 for storage therein.

When offline, the first computing entity 12 is operable to use at least a portion of its stored authentication data (e.g., the private key) when generating the authorization code 93. For example, the first computing entity 12 encodes the authorization code 93 (or a string into a scannable code) using a private key where the digital asset-based interaction computing entity 16 is able to decode the authorization code 93 (or a string into a scannable code) using the public key to verify that the authorization code originated from the first computing entity, to verify the user of the first computing entity, etc.

As another example, the first computing entity 12 appends a portion of authentication data to the authorization code 93 such as a time stamp. For example, a clock of the digital asset-based interaction interface 25-1 of the first computing entity 12 is synced with the clock of the digital asset-based interaction computing entity 16 (e.g., via a time synchronization protocol such as network time protocol (NTP), precision time protocol (PTP), etc.). The digital asset-based interaction interface 25-1 of the first computing entity 12 is operable to time stamp the authorization code 93 with a time stamp (e.g., a digital signature containing a hash value and current time and/or date, timestamp token protected with a digital signature, etc.) that the digital asset-based interaction computing entity 16 can use to verify that the authorization code existed at a particular time.

The method continues with step 3 where the second computing entity 14 is operable to scan the authorization code 93 via a scanning device of the second computing entity 14 (or otherwise receive the authorization code 93 via the digital asset-based interaction interface 25-2). For example, a user of the first computing entity 12 places the first computing entity 12 display near a scanning device of the second computing entity 14 (e.g., the second computing entity 14 is a tablet and the scanning device is a front or back camera) for the second computing entity 14 to capture the authorization code 93. In that example, the second computing entity 14 may be an unattended POS register (e.g., at a retail kiosk, self-checkout location, a gas pump checkout, a vending machine, etc.).

As another example, the second computing entity 14 is a POS register that includes a handheld scanning device (e.g., a barcode scanner, a smart phone camera, etc.). The user of the first computing entity 12 presents the authorization code 93 to an attendant of the second computing entity 14, and the attendant scans the authorization code 93 with the handheld scanning device. As another example, when the authorization code 93 is a key code, the first computing entity 12 enters the key code onto a touchscreen or keypad of the second computing entity 14 and/or sends the key code to the second computing entity 14 via an interface means (e.g., NFC, etc.).

If user metadata is included in the authorization code 93, the second computing entity 14 is operable to view that metadata upon scanning and/or receiving. For example, the user's loyalty information applies a discount to the total amount owed. As another example, a user's shipping information adjusts the shipping rate applied to the total amount owed.

The method continues with step 4 where, when the second computing entity 14 scans and/or receives the authorization code 93, the second computing entity 14 sends the code authentication information 81 (e.g., the entire authorization code 93 and/or a portion thereof) and first and second computing entity real-time information to the digital asset-based interaction computing entity 16. The first and second computing entity real-time information includes a first and second identifier (e.g., a user ID, a merchant ID), the digital asset used by the first computing entity, a desired asset format (e.g., a fiat currency, a cryptocurrency, etc.) the second computing entity wishes to receive assets. The second computing entity real-time information also includes the amount of the real-time digital asset-based interaction in this example. The second computing entity real-time information may include other information and/or metadata such as discounts offered and/or applied, shipping details (rates, method, etc.), bill splitting options, etc.

The method continues with step 5 where the code generation and analysis module 88 of the digital asset-based interaction computing entity 16 verifies the authorization code 93 information using at least a portion of the authorization code 93 and/or the code authentication information 81. For example, the code generation and analysis module 88 identifies the authorization code 93 as associated with the first computing entity (e.g., via a first computing entity ID, via the code authentication information 81, etc.) and utilizes a stored public key associated with the first computing entity to decode the authorization code 93 and verify the private key used by the first computing entity. As another example, the code generation and analysis module 88 verifies that the authorization code 93 timestamp in accordance with the digital asset-based interaction computing entity 16 clock.

When the authorization code 93 is verified, the method continues with steps 6a-6b which may occur concurrently or in a different order (e.g., step 6b occurs slightly before step 6a). In step 6a, the digital asset-based interaction computing entity 16 locks the rate quote for the digital asset selected by the first computing entity 12 such that the rate quote presented to the first computing entity 12 (via the asset management unit 22-1 balance in US dollars or other asset unit) is what is used for the real-time digital asset-based interaction even if the rate fluctuates during the interaction.

The method continues with step 6b where the digital asset-based interaction computing entity 16 locks an amount of system digital asset (e.g., that was deposited by the digital asset management computing entity associated with the asset management unit 22) as collateral for the digital asset-based interaction. The amount of system digital asset locked may be based on the first computing entity 12 (e.g., how much the first computing entity typically spends, how much digital asset the first computing entity has in the asset management unit, etc.) and/or the second computing entity 14 (e.g., what type of products the merchant sells, an average price point of items the merchant sells, a default collateral amount the merchant requires, etc.).

When the system digital asset has been locked for the digital asset-based interaction, the method continues with step 7 where the digital asset-based interaction computing entity 16 provides a confirmation to the second computing entity 14 that the real-time digital asset-based interaction is approved (i.e., authorized). The authorization code 93 implies authorization of the interaction, but funds are not necessarily pulled from the first computing entity 12 for a time period (e.g., until the first computing entity is back online). As such, the method continues with an optional step 8 where the first computing entity 12 has a certain amount of time (a few seconds to up to five minutes) to implement after-interaction options. The after-interaction options include switching between asset management units, switching the type of digital asset used, adding a tip, splitting the bill, moving items for purchase between users, etc. The method continues with steps similar to steps 36-44 of FIGS. 2 and 2A.

Figure 10A:
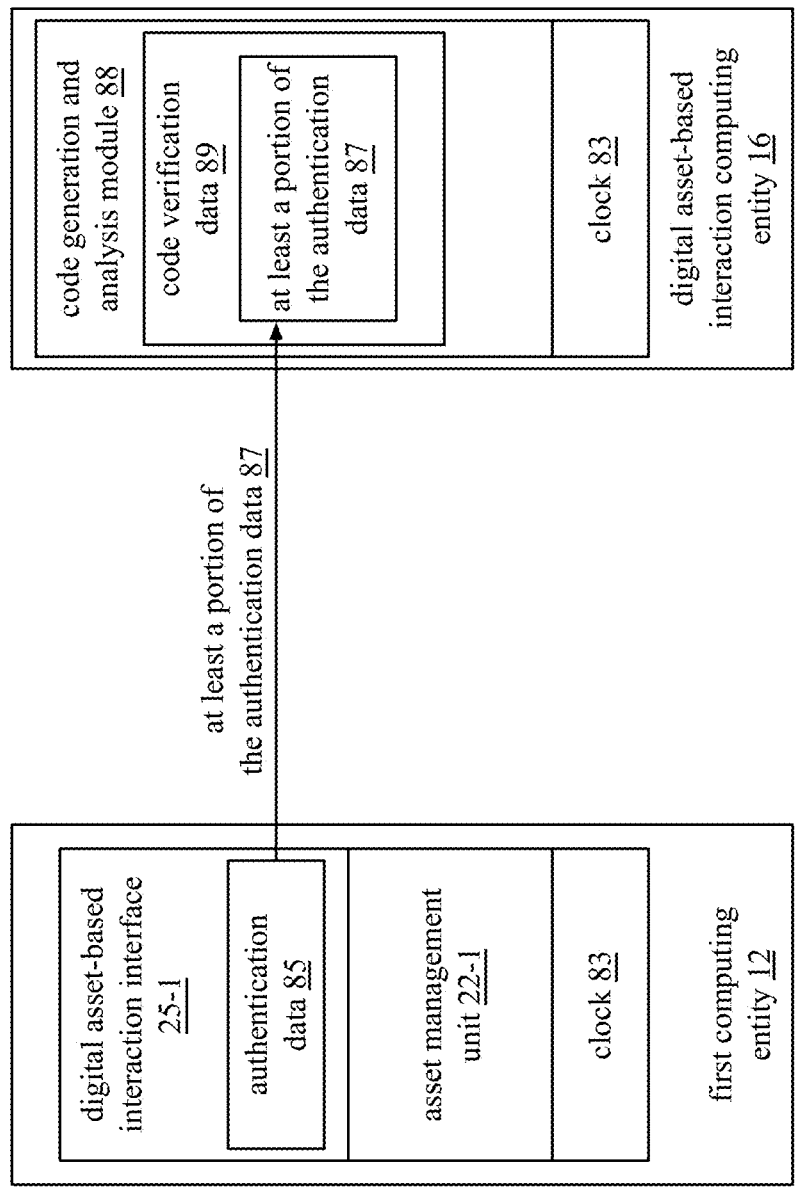
FIGS. 10A-10C are schematic block diagrams of an embodiment of generating an authorization code for offline digital asset-based interactions.
Figure 10B:
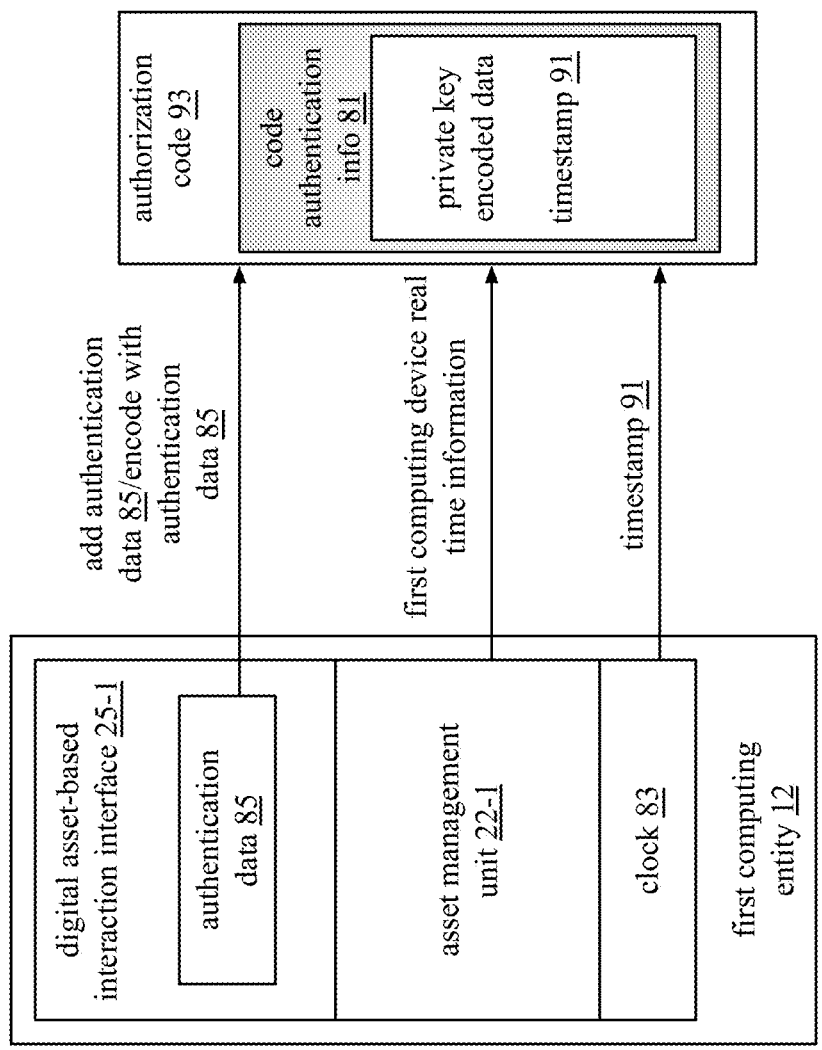
Figure 10C:
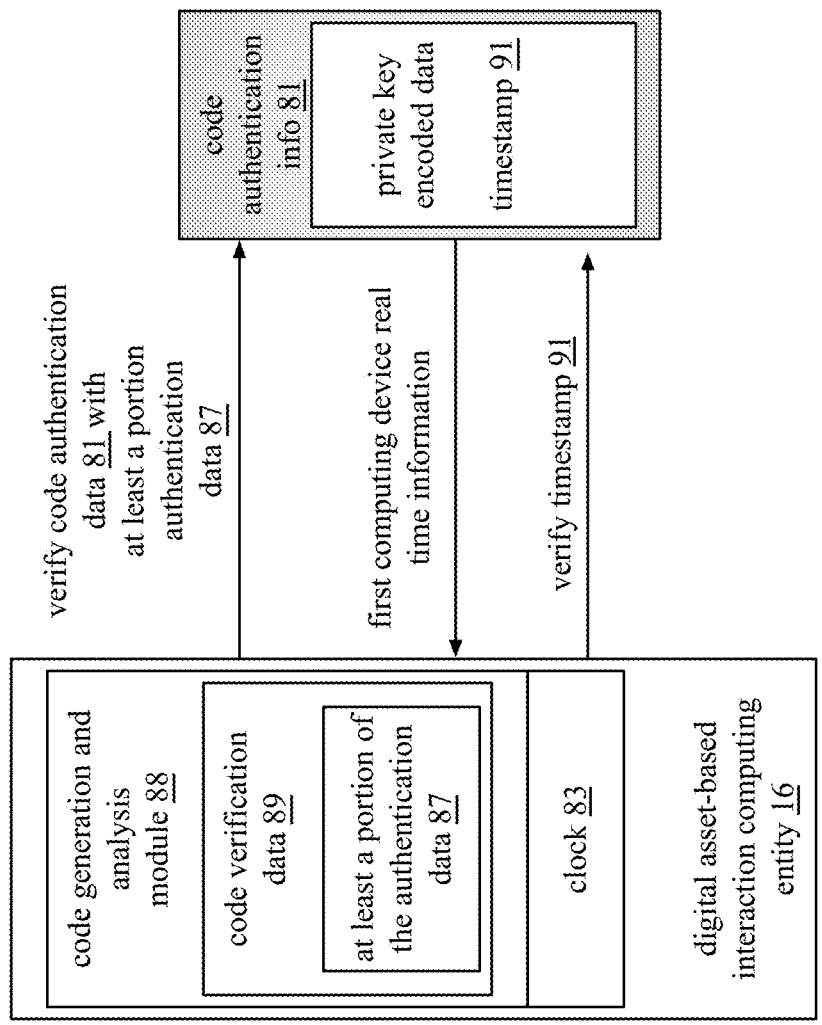

FIGS. 10A-10C are schematic block diagrams of an embodiment of generating an authorization code 93 with code authentication information for offline digital asset-based interactions. FIG. 10A includes the first computing entity 12 and the digital asset-based interaction computing entity 16 and shows an example of communicating at least a portion of authentication data 87 from the first computing entity 12 and to the digital asset-based interaction computing entity 16.

The digital asset-based interaction interface 25-1 of the first computing entity 12 generates and/or stores authentication data 85 (e.g., a public/private key pair, username and and/or password, digital signatures, etc.). At a time prior to initiation of a digital asset-based interaction and/or prior to network connection becoming unavailable (e.g., at installation of the asset management unit 22-1, upon anticipation of the connection becoming unavailable, etc.), the first computing entity 12 shares at least a portion of the authentication data 87 with the digital asset-based interaction computing entity 16. For example, the first computing entity 12 generates a public/private key pair, stores the private key, and sends the public key to the digital asset-based interaction computing entity 16 for storage therein.

The digital asset-based interaction interface 25-1 of the first computing entity 12 and the digital asset-based interaction computing entity 16 further include clocks 83. The clock 83 of the digital asset-based interaction interface 25-1 is synced with the clock 83 of the digital asset-based interaction computing entity 16 (e.g., via a time synchronization protocol such as network time protocol (NTP), precision time protocol (PTP), etc.).

FIG. 10B continues the example of FIG. 10A and depicts the first computing entity 12 generating an authorization code 93 using at least a portion of its stored authentication data 85 (e.g., the private key). For example, the first computing entity 12 encodes the authorization code 93 (or a string into a scannable code) using a private key. As another example, the first computing entity 12 appends a portion of authentication data to the authorization code 93 such as a time stamp. For example, a clock of the digital asset-based interaction interface 25-1 of the first computing entity 12 is synced with the clock of the digital asset-based interaction computing entity 16 (e.g., via a time synchronization protocol such as network time protocol (NTP), precision time protocol (PTP), etc.).

The digital asset-based interaction interface 25-1 of the first computing entity 12 is operable to time stamp the authorization code 93 with a time stamp (e.g., a digital signature containing a hash value and current time and/or date, timestamp token protected with a digital signature, etc.) that the digital asset-based interaction computing entity 16 can use to verify that the authorization code existed at a particular time.

The code authentication information 81 allows the digital asset-based interaction computing entity to verify that an authorization code 93 code is authentic (e.g., from an authorized user and/or device) even when it is not received from the first computing entity 12. The code authentication information 81 includes at least a portion of authentication data (e.g., a public/private key pair, username and/or password, digital signatures, timestamp, etc.) and/or data affected by at least a portion of authentication data (e.g., the authorization code 93 is encoded with a private key where the private key is the at least a portion of authentication data)). In this example, the code authentication information 81 includes private key encoded data and a timestamp 91. The authorization code 93 is also generated to include and/or be representative of first computing device real time information.

FIG. 10C continues the example of FIGS. 10A-10B and depicts the digital asset-based interaction computing entity 16 verifying the authorization code 93 based on the code authentication information 81. For example, when the second computing entity 14 scans and/or receives the authorization code 93, the second computing entity 14 sends the code authentication information 81 (e.g., the entire authorization code 93 and/or a portion thereof) and first and second computing entity real-time information to the digital asset-based interaction computing entity 16.

The code generation and analysis module 88 of the digital asset-based interaction computing entity 16 verifies the code authorization information 81 (e.g., the private key encoded data and a timestamp 91) using at least a portion of the stored authorization data 87. For example, the code generation and analysis module 88 identifies the authorization code 93 as associated with the first computing entity (e.g., via a first computing entity ID, via the code authentication information 81, etc.) and utilizes a stored public key associated with the first computing entity (i.e., at least a portion of the authentication data 87) to decode the private key encoded data of the code authorization information 81 and verify that the private key used by the first computing entity was correct. As another example, the code generation and analysis module 88 verifies that the timestamp 91 is in accordance with the digital asset-based interaction computing entity 16 clock.

Figure 11:
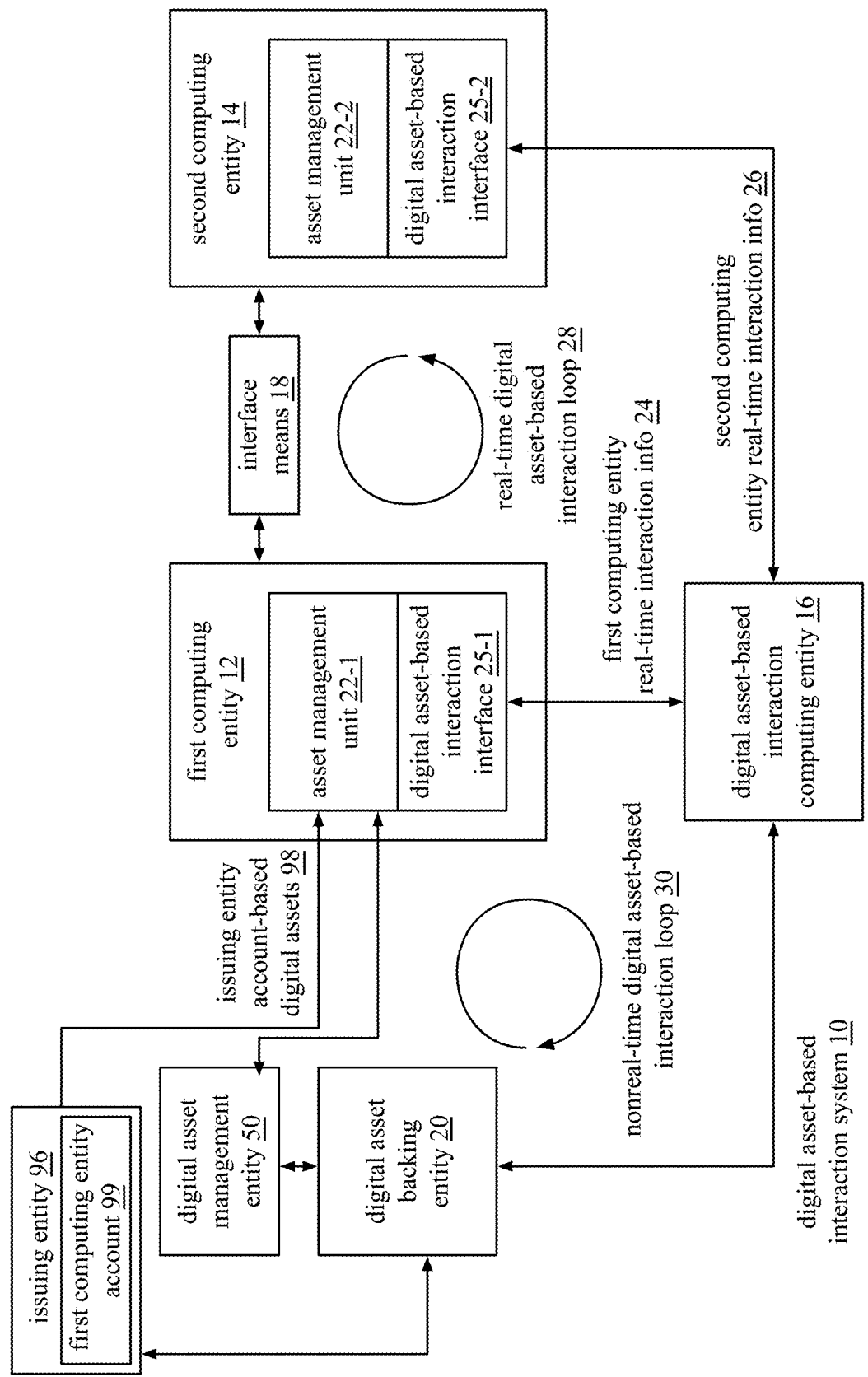
FIG. 11 is a schematic block diagram of another embodiment of a digital asset-based interaction system.

FIG. 11 is a schematic block diagram of an embodiment of a digital asset-based interaction system 10 that includes a first computing entity 12, a second computing entity 14, a digital asset-based interaction computing entity 16, an interface means 18, a digital asset backing computing entity 20, a digital asset management computing entity 50, and an issuing entity 96. The digital asset-based interaction system 10 of FIG. 11 operates similarly to the digital asset-based interaction system 10 of FIG. 1 except for the addition of the issuing entity 96.

The issuing entity 96 may be one or more computing devices, one or more distributed computing devices, and/or one or more modules executing on one or more computing devices. The issuing entity 96 is associated with a merchant and/or company that provides goods and/or service to customers and/or users and implements a loyalty and/or incentive program where points (and/or other unit of value) are issued based on customer and/or user actions. The points are accumulated by customers and/or users and are usable as credit for purchases, gifts, cash back, and/or rewards within the issuing entity's eco-system. For example, the issuing entity 96 is associated with a credit card company that issues airline miles and/or points representative of value (e.g., fiat currency) for customer actions (e.g., a successful transaction, a transaction made at a particular merchant, signing up for an account, reaching a milestone such as number of transactions and/or length of relationship, etc.).

As another example, the issuing entity 96 is associated with a retail merchant that provides customer loyalty points to customers representative of store credit or other value for various customer actions (e.g., quantity of purchases, amount spent within a certain time period, etc.). As another example, the issuing entity 96 is associated with an airline that issues airline miles and/or customer loyalty points to customers representative of value for various customer actions (e.g., flight miles, length of membership, etc.).

In the above examples, the value issued by the issuing entity 96 is usable by customers within the issuing entity's eco-system (e.g., miles are usable at a particular airline, points are usable as store credit at a particular store, etc.). In the example of FIG. 11, the issuing entity 96 backs issuing entity account-based digital assets 98 with the digital asset backing computing entity 20 in order to extend the use of customer/user issued value (e.g., points, miles, etc.) as spendable digital assets within the digital asset-based interaction system 10. The issuing entity account-based digital assets are associated with a user account (e.g., a customer) associated with the issuing entity 96 and may be any type of digital asset backed for use within the digital asset-based interaction system 10 such as tokens, cryptocurrency, smart contracts, etc. Further, the issuing entity account-based digital assets backed by the digital asset-based interaction system 10 may represent anything of value such as points, monetary value, store credit, a status level, etc.

The issuing entity 96 is associated with the digital asset backing computing entity 20 via an account and is operable to deposit system digital assets into the account to back issuing entity account-based digital assets representative of customer loyalty and/or incentive units (e.g., an airline mile, a store loyalty point, etc.). For example, the issuing entity 96 generates a plurality of issuing entity account-based digital assets representative of customer loyalty and/or incentive units, establishes an account with the digital asset backing computing entity 20, and deposits an amount of system digital assets to back at least a portion of the plurality of issuing entity account-based digital assets. When the amount of system digital assets is deposited, the issuing entity account-based digital assets are useable within the digital asset-based interaction system 10 (e.g., users can spend the issuing entity account-based digital assets with digital asset-based interaction system 10 merchants).

In this example, the issuing entity 96 is associated with the first computing entity 12 via a first computing entity account 99. For example, the first computing entity 12 is a smart phone, the issuing entity 96 is an airline, and the user of the first computing entity 12 has an account with the airline where the user of the first computing entity 12 stores payment methods and personal information, manages flights, etc. In another embodiment, the second computing entity 14 is the issuing entity 96. For example, the second computing entity 14 is a merchant POS register capable of issuing loyalty points as a component of check out functionality.

Upon an issuance triggering action (e.g., a successful transaction between the first computing entity 12 and the issuing entity 96, a new membership/account, a length of time in which the first computing entity 12 is associated with the issuing entity 96, etc.) by the first computing entity 12, the issuing entity 96 issues an amount of issuing entity account-based digital assets 98 to the first computing entity 12. The amount of issuing entity account-based digital assets 98 is received and stored by a digital asset-based interaction system enabled asset management unit (e.g., the asset management unit 22-1) of the first computing entity 12 and is usable for digital asset-based interactions within the digital asset-based interaction system 10.

Figure 12:
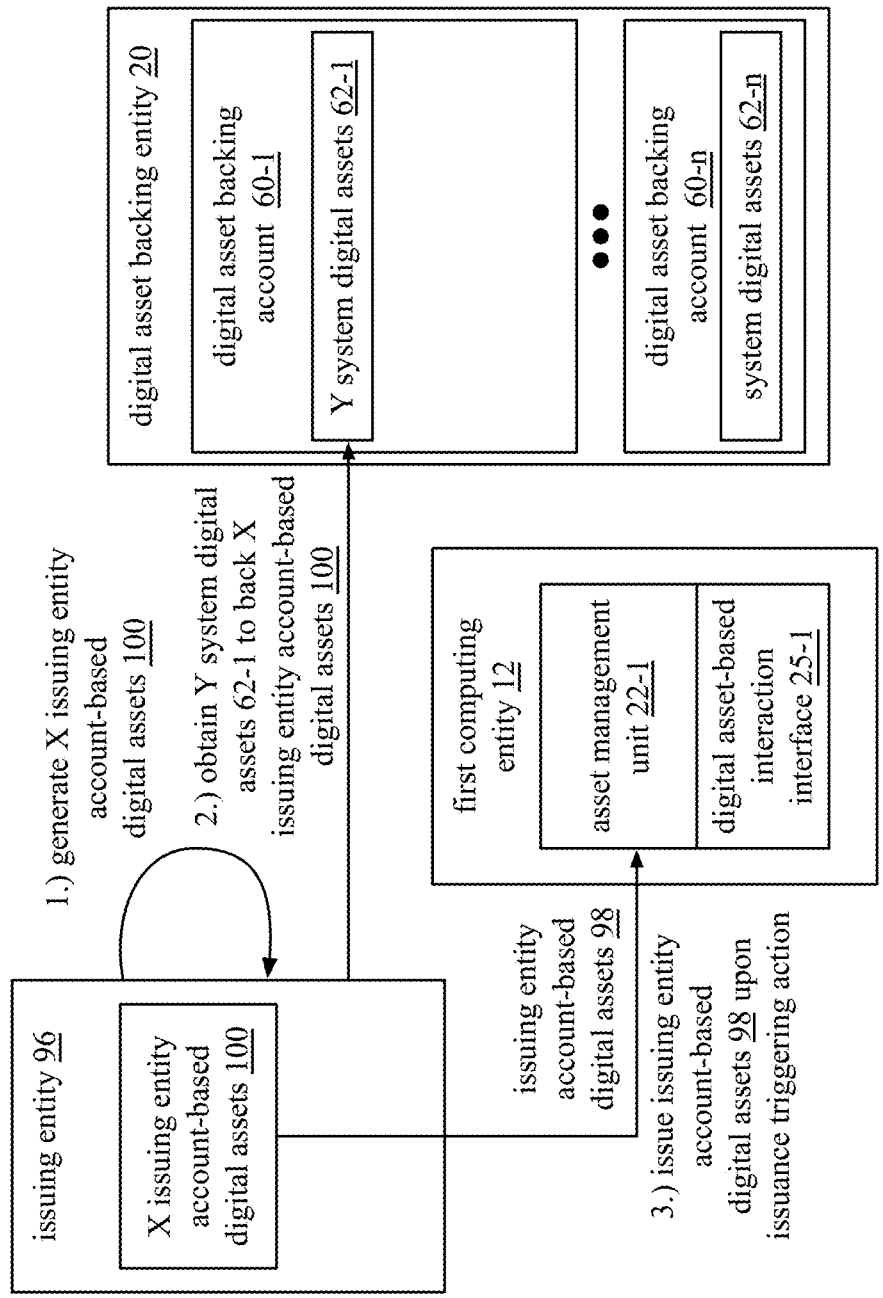
FIG. 12 is a flowchart of an example of a method of generating issuing entity account-based digital assets.

FIG. 12 is a method of an example of generating issuing entity account-based digital assets. FIG. 12 includes a first computing entity 12, a digital asset backing computing entity 20, and an issuing entity 96 that operates similarly to the example of FIG. 11 except that the digital asset backing computing entity 20 is shown in more detail.

The digital asset backing computing entity 20 includes a plurality of digital asset backing accounts 60-1 through 60-$n$. The plurality of digital asset backing accounts 60-1 through 60-$n$ store system digital assets 62-1 through 62-$n$ as collateral to back real-time digital asset-based interactions associated with a respective digital asset backing account 60-1 through 60-$n$.

The method begins with step 1 where the issuing entity 96 generates X issuing entity account-based digital assets (e.g., tokens or other digital asset) 100 to represent X units of value (e.g., loyalty points, miles, etc.). For example, to generate X tokens on an existing blockchain (e.g., Ethereum), the issuing entity 96 deploys a new smart contract, determines a token supply, enables sending of the token, sets token features (e.g., name, symbol, decimal units, etc.), generates a token transfer event, and launches the token.

The method continues with step 2 where the issuing entity 96 obtains (e.g., purchases, exchanges other assets for, etc.) a Y amount of system digital assets 62-1 to back the X amount of issuing entity account-based digital assets 100. The Y amount of system digital assets 62-1 obtained is determined based on a value of the X amount of issuing entity account-based digital assets 100 where the value is driven by the issuing entity 96. For example, issuing entity account-based digital asset value is based on the size of the issuing entity account-based digital asset base, velocity of the issuing entity account-based digital asset (speed at which transactions take place), and the quantity of the issuing entity account-based digital asset.

The method continues with step 3 where, upon an issuance triggering action made by the first computing entity 12, the issuing entity 96 issues an amount of issuing entity account-based digital assets 98 to the first computing entity 12. The issuance triggering action may include a successful transaction between the first computing entity 12 and the issuing entity 96, establishment of a new membership/account with the issuing entity 96, a length of time in which the first computing entity 12 has been associated with the issuing entity 96, and/or a certain amount that the first computing entity 12 has spent with the issuing entity 96.

Figure 13:
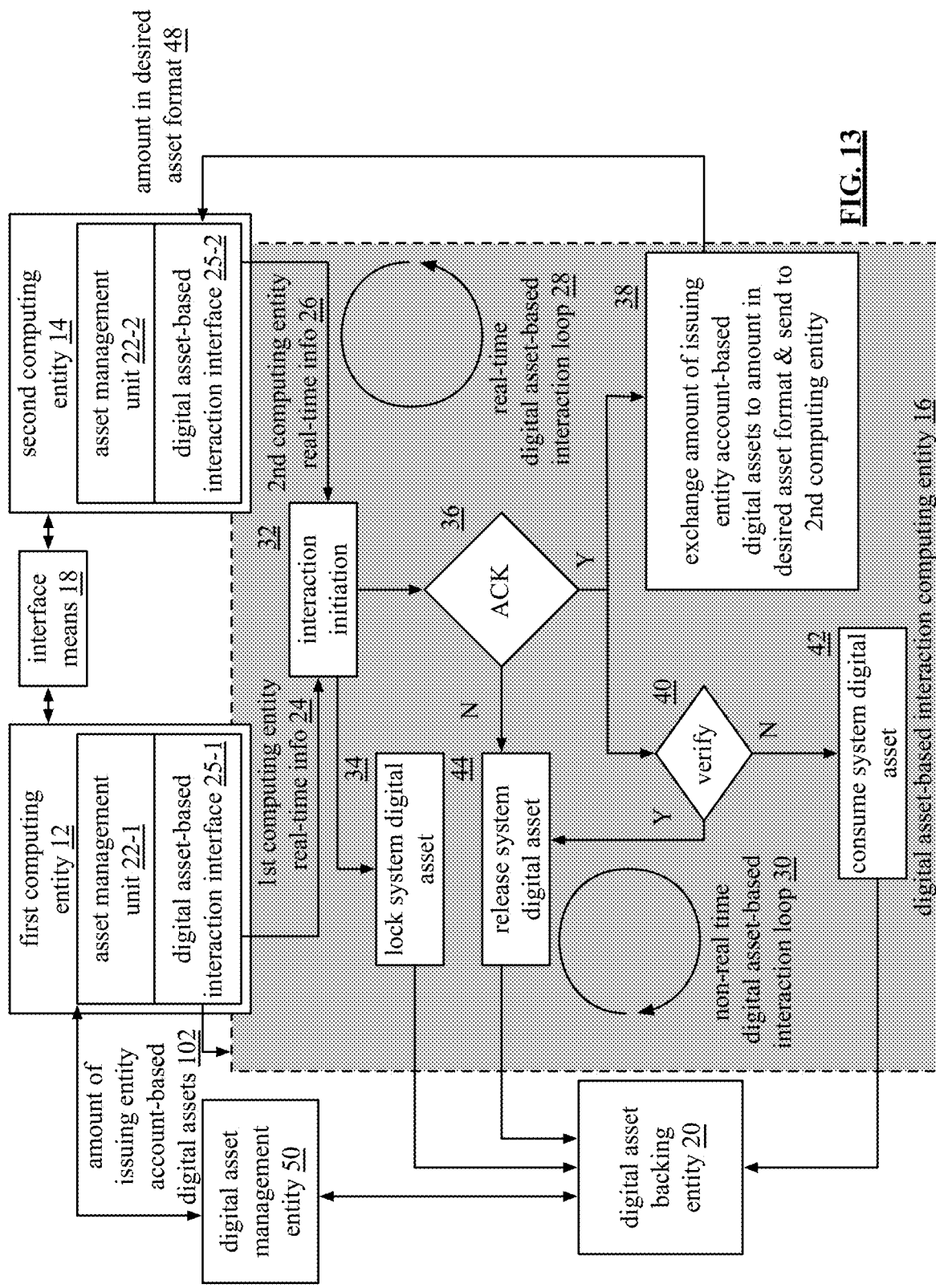
FIG. 13 is a flowchart of another example of a method for execution by a digital asset-based interaction computing entity of the digital asset-based interaction system.

FIG. 13 is a flowchart of an example of a method for execution by a digital asset-based interaction computing entity 16 of the digital asset-based interaction system 10. The method of FIG. 13 operates similarly to the method of FIG. 2 except that it depicts a specific example of the first computing entity using a desired digital asset of an amount of issuing entity account-based digital assets 102 (e.g., obtained from an issuing entity) for a digital asset-based interaction.

The method begins with step 32 where an interaction is initiated. An interaction is any activity involving sending digital asset-based value from the first computing entity to the second computing entity (e.g., a loan from the first computing entity to the second computing entity, a payment from the first computing entity to the second computing entity, a gift from the first computing entity to the second computing entity, etc.) where the second computing entity 14 accepts assets in a desired asset format (e.g., fiat currency or a desired digital asset that differs from the digital asset the first computing entity 12 wishes to use in the interaction). An interaction is initiated when the first and second computing entities interact via the interface means 18 as discussed with reference to FIG. 1.

During the interaction initiation, the digital asset-based interaction computing entity 16 receives first computing entity real-time information 24 and second computing entity real-time information 26 regarding the digital asset-based interaction between the first computing entity 12 sending digital assets and the second computing entity 14 accepting assets in a desired asset format.

For example, the first computing entity 12 sends first computing entity real-time information 24 to the digital asset-based interaction computing entity 16 via the digital asset-based interaction interface 25-1 of the asset management unit 22 and the second computing entity 14 sends second computing entity real-time information 26 to the digital asset-based interaction computing entity 16 via the digital asset-based interaction interface 25-2 (e.g., from either requesting or scanning a scannable code). As another example, the digital asset-based interaction interface of the first computing entity 12 or the second computing entity 14 may send the first and second computing entity real-time information 24 and 26 to the digital asset-based interaction computing entity 16 (e.g., the first computing entity 12 sends the second computing entity and the first computing entity real-time information 24 and 26).

The first computing entity real-time information 24 includes an identifier (e.g., a user ID) and a type of digital asset it wishes to use in a real-time digital asset based interaction with the second computing entity 14. In this example, the first computing entity real-time information 24 includes issuing entity account-based digital assets as the type of digital asset. The second computing entity real-time information 26 includes an identifier (e.g., a merchant ID) and a type of desired/selected asset format (e.g., a fiat currency, a cryptocurrency) for receiving value from the first computing entity 12. One or more of the first computing entity real-time information 24 and the second computing entity real-time information 26 includes the amount of the real-time digital asset-based interaction. The first computing entity real-time information 24 and the second computing entity real-time information 26 may include further information and/or metadata such as loyalty information, personal information (address, name, etc.), shipping details, bill splitting information, a request for additional information, etc.

When the digital asset-based interaction computing entity 16 receives the real-time information 24-26, the digital asset-based interaction computing entity 16 initiates 1) a real-time digital asset-based interaction process (e.g., the real-time digital asset-based interaction loop 28) and 2) a nonreal-time reconciliation process to reconcile the digital asset-based interaction with the digital asset backing computing entity 20 (e.g., the nonreal-time digital asset-based interaction loop 30). The reconciliation of the digital asset-based interaction with the digital asset backing computing entity 20 occurs within a time frame that is longer than the time frame of the real-time digital asset-based interaction.

The method continues with step 34 where, within the nonreal-time digital asset-based interaction loop 30, the digital asset-based interaction computing entity 16 instructs the digital asset backing computing entity 20 to lock an amount of system digital asset associated with the real-time digital asset-based interaction. The amount of system digital asset locked may be based on one or more of an amount involved in the interaction, a type of interaction, a type of item involved in the interaction, the first computing entity 12 (e.g., a typical amount the first computing entity 12 spends, an account balance, etc.), and the second computing entity 14 (e.g., the type of merchant the second computing entity 14 is associated with, a type of goods the merchant sells, a default amount set by the merchant, etc.).

When the digital asset-based interaction computing entity 16 locks the system digital asset, a rate quote for the issuing entity account-based digital assets may be locked as discussed with reference to FIG. 1. The method continues with step 36 where a network acknowledgment (ACK) of the receipt of the amount of the issuing entity account-based digital assets 102 is or is not generated. For example, when the digital asset-based interaction computing entity 16 receives an amount of issuing entity account-based digital assets 102 from the first computing entity 12 to use in the real-time digital asset-based interaction, the ACK is generated and the method continues to steps 38 and 40. If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28, the ACK is not generated, and the real-time digital asset-based interaction terminates. Within the nonreal-time digital asset-based interaction loop 30, when the ACK is not generated, the method continues with step 44 where the digital asset-based interaction computing entity 16 instructs the digital asset backing computing entity 20 to release the amount of locked system digital asset.

Within the real-time digital asset-based interaction loop 28, when the ACK is generated, the method continues with step 38 where the digital asset-based interaction computing entity 16 exchanges (or connects to a digital asset exchange to exchange) the amount of the issuing entity account-based digital assets 102 received from the first computing entity 12 to an amount of assets in a desired asset format (e.g., fiat currency, a particular digital asset, etc.). Digital asset exchange is done quickly (e.g., 30 seconds to a few minutes) to account for exchange rate volatility. The digital asset-based interaction computing entity 16 sends the amount in the desired asset format 48 to the second computing entity 14 to complete the real-time digital asset-based interaction.

Within the nonreal-time digital asset-based interaction loop 30, when the ACK is generated at step 36, the method continues with step 40 where the digital asset-based interaction computing entity 16 verifies the amount of the issuing entity account-based digital assets 102 received from the first computing entity 12. For example, the digital asset-based interaction computing entity 16 connects to a consensus network associated with the blockchain of the amount of the issuing entity account-based digital assets where the consensus network verifies the amount of the issuing entity account-based digital assets received from the first computing entity 12. The consensus network implements a verification process that may take minutes to hours of time. Other digital asset verification processes are possible and are based on the type of digital asset involved.

When the digital asset-based interaction computing entity 16 verifies the amount of the issuing entity account-based digital assets 102 received by the first computing entity 12 at step 40, the method continues to step 44 where the digital asset-based interaction computing entity 16 instructs the digital asset backing computing entity 20 to release the amount of system digital asset locked for the real-time digital asset-based interaction. When the digital asset-based interaction computing entity 16 does not verify the amount of the issuing entity account-based digital assets 102 received by the first computing entity 12 at step 40, the method continues to step 42 where the digital asset-based interaction computing entity 16 instructs the digital asset backing computing entity 20 to consume the amount of system digital asset locked for the real-time digital asset-based interaction. Consuming the amount of system digital asset means that the digital asset backing computing entity 20 transfers the amount of system digital asset to an address controlled by the digital asset-based interaction computing entity 16 in order to cover the amount of the real-time digital asset-based interaction.

Figure 14:
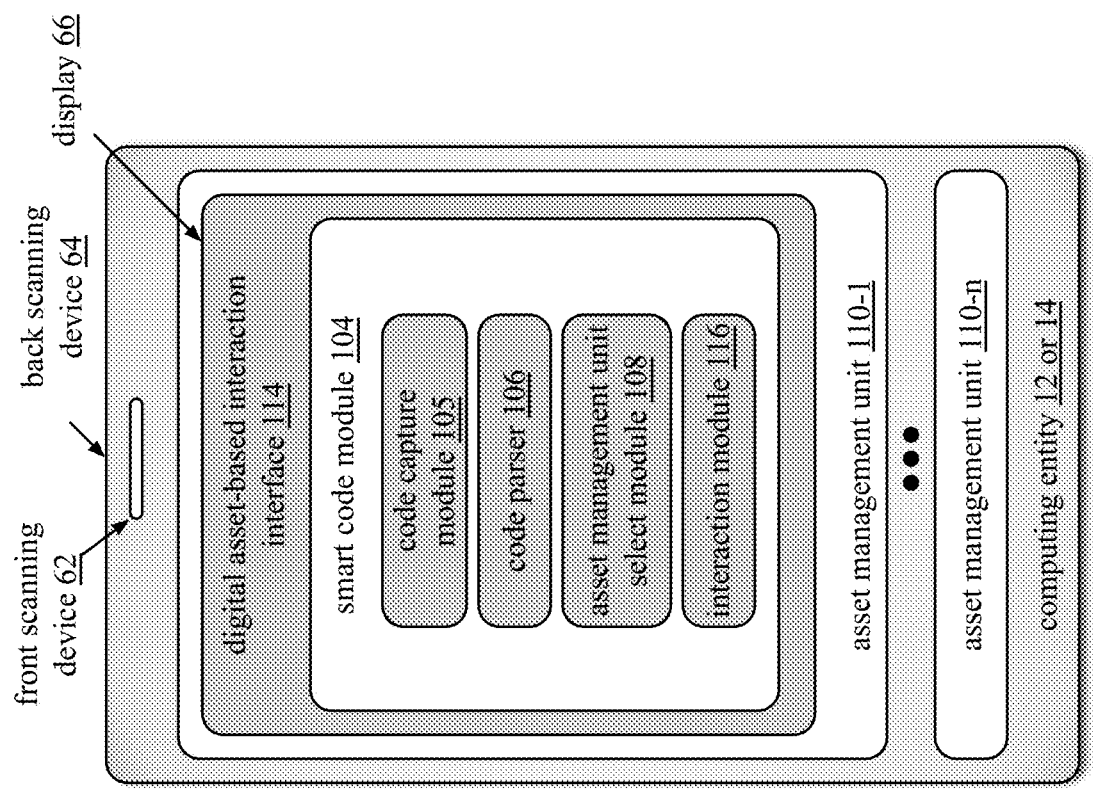
FIG. 14 is a schematic block diagram of another embodiment of a computing entity of a digital asset-based interaction system.

FIG. 14 is a schematic block diagram of an embodiment of a computing entity 12 or 14 of a digital asset-based interaction system. The computing entity 12 or 14 may be the first or second computing entity 12 or 14 of previous Figures. The computing entity 12 or 14 includes a plurality of asset management units 110-1 through 110-*n*, a display 66, a front scanning device 62 (e.g., a front camera), and a back scanning device 64 (e.g., a back camera). A scanning device may be a video device, a camera, an infrared (IR) device, a barcode scanner, etc. The computing entity 12 or 14 may have more or less scanning devices than shown. Further, the scanning devices may be located in different positions on the first computing entity 12 than what is shown. The display 66 may be a liquid crystal display (LCD), a light emitting diode (LED), and/or other type of display technology.

The plurality of asset management units 110-1 through 110-*n* may include asset management units associated with the with the digital asset-based interaction system and some that are not. In this example, the asset management unit 110-1 is associated with the digital asset-based interaction system and includes a digital asset-based interaction interface 114. The digital asset-based interaction interface 114 operates similarly to the digital asset-based interaction interface of FIG. 4 except that instead of the code module 74, the digital asset-based interaction interface 114 includes a smart code module 104. The digital asset-based interaction interface 114 may include one or more additional modules such as an asset depository and/or acceptance unit module, an entity selection module, an interaction confirmation module, an after-interaction module, and a security module as discussed with reference to FIG. 4. More or less modules are possible.

The smart code module 104 is coupled to a scanning interface of the computing entity 12 or 14, the front scanning device 62, and/or the back scanning device 64. The smart code module 104 includes image capturing, image display, image processing, and/or encoding/decoding circuitry operable to capture, display, and/or analyze optically scanned, saved (e.g., a screenshot of a code, a code stored in a memory) or otherwise detected image data such as graphical coded representations of data (e.g., barcodes).

In particular, the smart code module 104 includes a code capture module 105, a code parser 106, an asset management unit select module 108, and an interaction module 116. The code capture module 105 includes software for detecting and capturing/formatting scannable codes captured by the front and/or back scanning devices 62-64. The code capture module 105 is operable to receive codes (e.g., from the digital asset-based interaction computing entity), detect scannable codes, and capture/scan/format scannable codes (e.g., capture via the front and/or back optical scanner 62-64, digitize, and bring into a frame of reference).

The code parser 106 parses information within the digitized code to determine code information. The code parser 106 may include a lexer (i.e., a scanner and/or tokenizer) that scans an input to produce a string of tokens and a parser that scans the string of tokens to produce an organized parsed result (e.g., a parse tree, an abstract syntax tree). As another example, the code parser may process the original information directly (e.g., without a lexer). The information within the digitized code may include an identifier, a string, a memo field, a bank identification number (BIN), a prefix, and an asset management unit address. The code parser 106 parses that information and outputs code information such as a type of the code, identity of an asset management unit for processing the code, interaction information (e.g., a type of digital asset, an amount of the interaction, etc.), etc.

The code parser 106 communicates the code information with the interaction module 116 and the asset management unit select module 108. For example, the code parser 106 sends interaction information to the interaction module 116 where the interaction module is operable to display scannable codes on the display 66, display the interaction information interpreted from a scannable code, and/or further interpret the interaction information.

The code parser 106 communicates code information to the asset management unit select module 108 where the asset management unit select module 108 is operable to select an asset management unit of the plurality of asset management units 110-1 through 110-*n* for processing the digital asset-based interaction and forward code and/or interaction information to the selected asset management unit. For example, based on a code prefix, the code parser 106 outputs an asset management unit identification. Based on the asset management unit identification, the asset management unit select module 108 determines that the digital asset-based interaction can be processed by the asset management unit 110-1 and that it does not need to redirect the code information and/or interaction information to a different asset management unit.

In another example, based on the asset management unit identification, the asset management unit select module 108 determines that the digital asset-based interaction needs to be redirected to a different the asset management unit. The asset management unit select module 108 is operable to direct the code, the code information, and/or the interaction information to the appropriate asset management unit such that the appropriate asset management unit automatically opens (or a push notification to switch applications is presented) for a user upon scanning a code.

If the asset management unit select module 108 is unable to determine which asset management units 110-1 through 110-$n$ is capable of processing the code and/or interaction, an error message is displayed.

Figure 15:
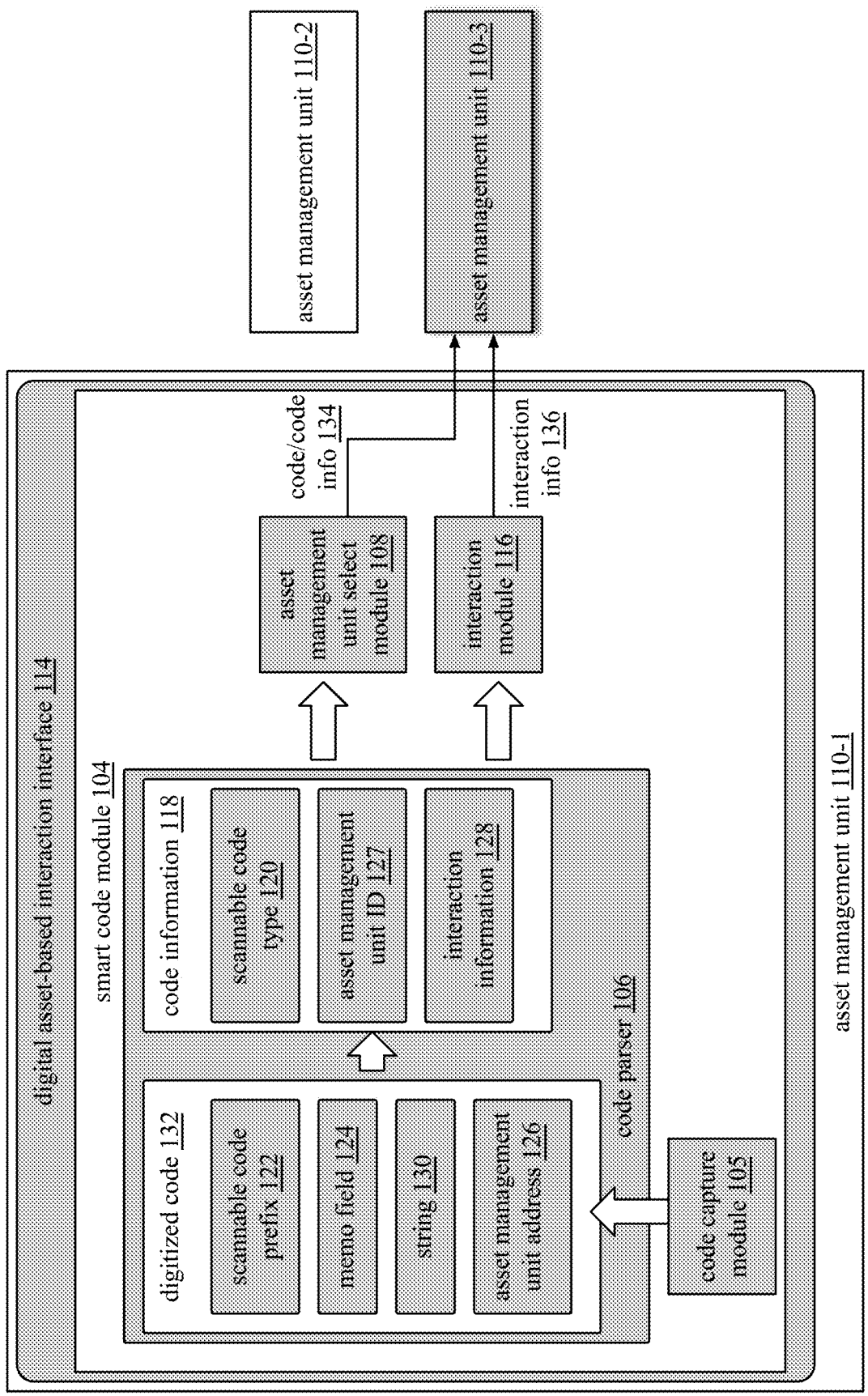
FIG. 15 is a schematic block diagram of another embodiment of a computing entity of a digital asset-based interaction system.

FIG. 15 is a schematic block diagram of an embodiment of a portion of a computing entity 12 or 14 of a digital asset-based interaction system that includes asset management units 110-1 through 110-3. The asset management unit 110-1 is associated with the digital asset-based interaction system via a digital asset-based interaction interface 114. The digital asset-based interaction interface 114 includes a smart code module 104. The smart code module 104 operates similarly to the smart code module of FIG. 14 except that the code parser 106 is shown in more detail.

The code capture module 105 is operable to receive codes (e.g., from the digital asset-based interaction computing entity), detect scannable codes, and capture/scan/format scannable codes (e.g., capture via the front and/or back optical scanner 62-64, digitize, and bring into a frame of reference) to produce a digitized code 132. The code parser 106 is operable to scan and parse the digitized code 132 to determine code information 118. In this example, the digitized code 132 includes a scannable code prefix 122 (e.g., a bank identification number (BIN) prefix), a memo field 124, a string 130, and an asset management unit address 126.

The code parser 106 scans and parses the scannable code prefix 122, the memo field 124, a string 130, the asset management unit address 126, to produce the code information 118 that includes a scannable code type 120, an asset management unit identifier (ID) 127, and interaction information 128 (e.g., a type of digital asset, an amount of the interaction, etc.).

The code parser 106 communicates the code information 118 with the asset management unit select module 108 and the interaction module 116. The asset management unit select module 108 uses the code information 118 to determine the appropriate asset management unit for processing the interaction indicated by the scannable code. The asset management unit select module 108 is operable to locate the appropriate asset management unit within the computing entity 12 or 14, send information to the appropriate asset management unit, and (optionally) return to current asset management unit 110-1.

As a specific example, the asset management unit select module 108 selects the asset management unit 110-3 based on the asset management unit ID 127 determined by the asset management unit address 126 in the code information 118. The asset management unit select module 108 sends the code and/or the code information 134 to the asset management unit 110-3. One or more of the asset management unit select module 108 and the interaction module 116 is operable to forward the interaction information 136 to the asset management unit 110-3 if required for interaction processing. Forwarding and/or sending the code and/or the code information 134 and/or the interaction information 136 to the asset management unit 110-3 may automatically open the asset management unit 110-3 application on the first computing entity. In another example, a user of the computing entity is presented with a push notification to open the asset management unit 110-3 in order to proceed with the digital asset-based interaction.

When more than one asset management unit of the plurality of asset management units 110-1 through 110-3 are operable to process the digital asset-based interaction, the type of scannable code is indeterminable, and/or an appropriate asset management unit is indeterminable, the asset management unit select module 108 implements one or more conflict resolution protocols.

For example, when more than one asset management unit of the plurality of asset management units 110-1 through 110-3 are operable to process the digital asset-based interaction, a conflict resolution protocol implemented may be to prioritize the asset management unit that is currently open (i.e., in which the smart code module is installed in) and in use. As another example, when more than one asset management unit of the plurality of asset management units 110-1 through 110-3 is operable to process the digital asset-based interaction, a conflict resolution protocol implemented may be to prioritize a default asset management unit set by a user preference. As another example, when more than one asset management unit of the plurality of asset management units 110-1 through 110-3 is operable to process the digital asset-based interaction, the conflict resolution protocol implemented may be to offer the user of the computing entity a choice of asset management unit to use in the digital asset-based interaction.

Figure 16:
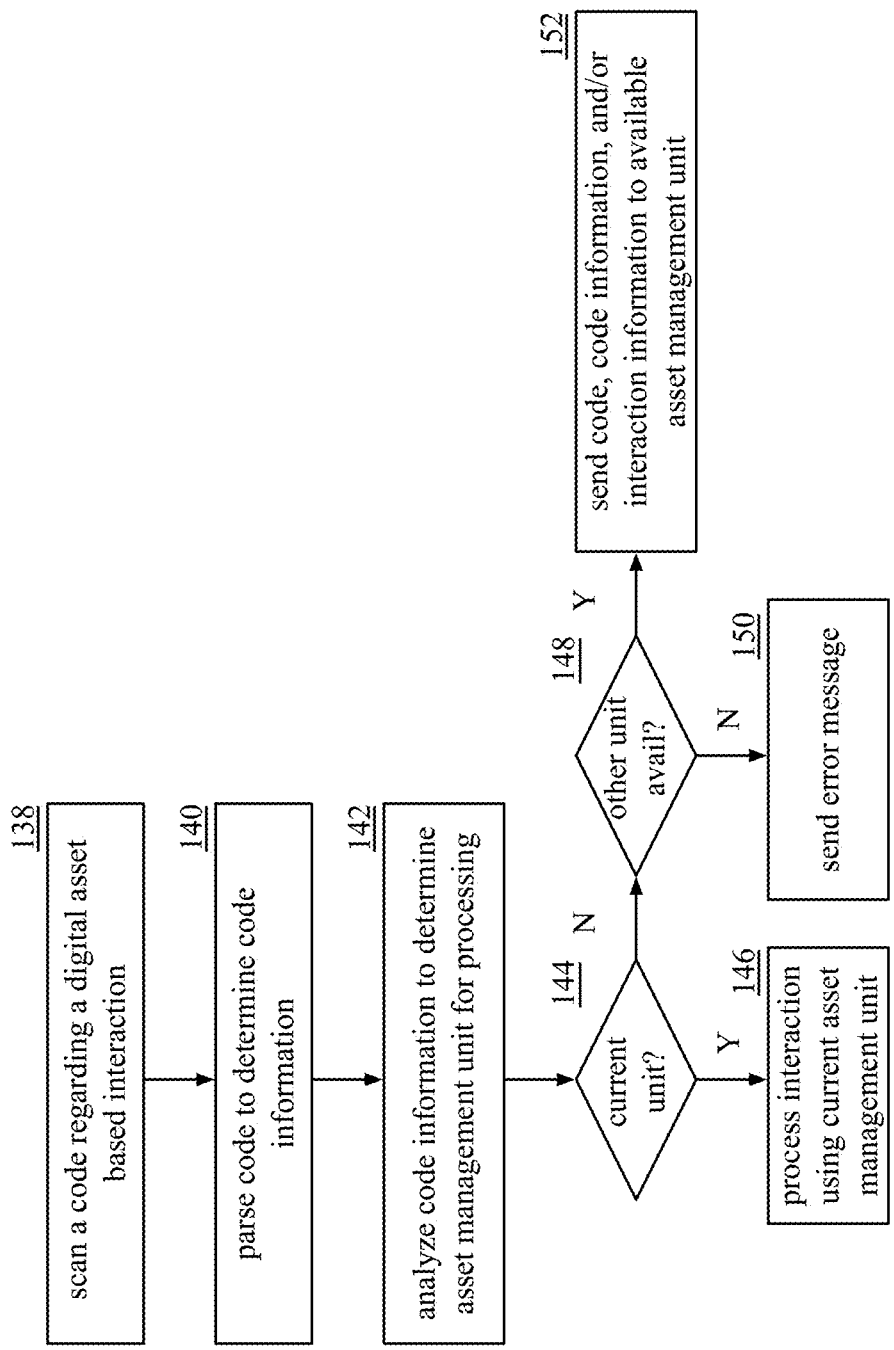
FIG. 16 is a flowchart of another example of a method of processing a code by a smart code module of a computing entity of the digital asset-based interaction system.

FIG. 16 is a flowchart of an example of a method of a processing a code by a smart code module of a computing entity of the digital asset-based interaction system. The method begins with step 138 where a code capture module of a smart code module of a digital asset-based interaction interface of an asset management unit of a computing entity of a digital asset-based interaction system scans and captures a scannable code regarding a digital-asset based interaction to produce a digitized code. The code capture module includes image capturing, image display, image processing, and/or encoding/decoding circuitry operable to capture, and display optically scanned, saved (e.g., a screenshot of a code, a code stored in a memory) or otherwise detected image data such as graphical coded representations of data (e.g., barcodes) to produce a digitized code.

The method continues with step 140 where a code parser of the smart code module parses the digitized code to determine code information. The code parser may include a lexer (i.e., a scanner and/or tokenizer) that scans an input to produce a string of tokens and a parser that scans the string of tokens to produce an organized parsed result (e.g., a parse tree, an abstract syntax tree). As another example, the code parser may process the original information in the digitized code directly (e.g., without a lexer). The information within the digitized code may include an identifier, a string, a memo field, a bank identification number (BIN), a prefix, and an asset management unit address. The code parser parses that information and outputs code information such as a type of the code, identity of an asset management unit for processing the code, interaction information (e.g., a type of digital asset, an amount of the interaction, etc.), etc.

The method continues with step 142 where an asset management unit select module of the smart code module analyzes the code information to determine an asset management unit for processing the digital-asset based interaction. For example, the code parser communicates code information to the asset management unit select module where the asset management unit select module is operable to select an asset management unit of the plurality of asset management units for processing the digital asset-based interaction based on the code information (e.g., an asset management unit identifier). For example, the asset management unit select is operable to locate the appropriate asset management unit within the computing entity, send information to the appropriate asset management unit, and (optionally) return to current asset management unit.

The method continues with step 144 where the asset management unit select module determines whether the asset management unit of the plurality of asset management units for processing the digital asset-based interaction is the current asset management unit. For example, based on an asset management unit ID, the asset management unit select module determines that the digital asset-based interaction can be processed by the current asset management unit and that it does not need to redirect the code information and/or interaction information to a different asset management unit.

When the asset management unit select module determines that the digital asset-based interaction can be processed by the current asset management unit, the method continues with step 146 where the interaction is processed by the current asset management unit. When the asset management unit select module determines that the digital asset-based interaction cannot be processed by the current asset management unit, the method continues with step 148 where the asset management unit select module determines whether the computing entity has an appropriate asset management unit available for processing the interaction.

When the asset management unit select module determines that there is no asset management unit available to process the interaction, the method continues with step 150 where an error message is sent to the user of the computing entity. When the asset management unit select module determines that there is an asset management unit available to process the interaction, the method continues with step 152 where the asset management unit forwards and/or sends the code and/or the code information and/or the interaction information to the appropriate asset management unit. The selected asset management unit may automatically open when the code, the code information, and/or the interaction information is sent, or a user of the computing entity may be presented with a push notification to open the selected asset management unit in order to proceed with the digital asset-based interaction.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items.

As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   initiating, by a first computing entity of one or more computing entities of a digital asset-based interaction system, an interaction with a second computing entity of the one or more computing entities, wherein the interaction includes the first computing entity providing an amount of a digital asset associated with a distributed ledger technology via an on-chain transaction through a digital asset-based interaction interface of the first computing entity to a digital asset-based interaction computing entity and the second computing entity accepting assets in a desired asset format;
   entering, by one or more of the first computing entity and the digital asset-based interaction computing entity, into an offline interaction mode during the interaction, wherein the offline interaction mode is the result of a disconnection between the first computing entity and the digital asset-based interaction computing entity;
   generating, by the first computing entity, an authorization code that includes an identifier of the first computing entity, a type of the digital asset, and digital asset-based interaction computing system code information, wherein the first computing entity generates the authorization code using at least a portion of stored authentication data;

providing, by the first computing entity, the authorization code to the second computing entity;

sending, by the second computing entity through a digital asset-based interaction interface of the second computing entity, at least a portion of the authorization code and second computing entity real time information to the digital asset-based interaction computing entity, wherein the second computing entity real time information includes the desired asset format and an amount of the interaction;

verifying, by the digital asset-based interaction computing entity, the at least a portion of the authorization code using at least a portion of the digital asset-based interaction computing system code information;

locking, by the digital asset-based interaction computing entity, an amount of system digital assets to back the amount of the digital asset such that the interaction can be processed in accordance with a real-time digital asset-based interaction process; and sending, by the digital asset-based interaction computing entity, a confirmation to the second computing entity that the interaction is successful.

2. The method of claim 1, wherein the real-time digital asset-based interaction process comprises:

obtaining, by the digital asset-based interaction computing entity, the amount of the digital asset from the first computing entity;

exchanging, by the digital asset-based interaction computing entity, the amount of the digital asset for an equivalent amount of assets in the desired asset format; and sending, by the digital asset-based interaction computing entity, the assets in the desired asset format to the second computing entity.

3. The method of claim 2 further comprises:

implementing, by the digital asset-based interaction computing entity, a nonreal-time verification process associated with the digital asset to verify the obtaining the amount of the digital asset from the first computing entity;

when the obtaining the amount of the digital asset is verified by the nonreal-time verification process:
unlocking, by the digital asset-based interaction computing entity, the amount of system digital asset; and when the obtaining the amount of the digital asset is not verified by the nonreal-time verification process:
consuming, by the digital asset-based interaction computing entity, the amount of system digital asset.

4. The method of claim 1, wherein the offline interaction mode includes an unintentional or intentional disconnection between the first computing entity and the digital asset-based interaction computing entity.

5. The method of claim 1, wherein the digital asset-based interaction computing system code information includes one or more of:
a public/private key pair;
a timestamp;
username;
password; and
one or more digital signatures.

6. The method of claim 1 further comprises:
prior to entering the offline interaction mode:
syncing, by the digital asset-based interaction computing entity, a first computing entity clock with a digital asset-based interaction computing entity clock.

7. The method of claim 1 further comprises:
prior to entering the offline interaction mode:
storing, by the digital asset-based interaction computing entity, the at least a portion of the digital asset-based interaction computing system code information.

8. The method of claim 1 further comprises:
locking, by the digital asset-based interaction computing entity, a rate quote for the digital asset.

9. A computer readable memory comprises:
a first memory element that stores operational instructions that, when executed by a first computing entity of one or more computing entities of a digital asset-based interaction system, causes the first computing entity to:
initiate an interaction with a second computing entity of the one or more computing entities, wherein the interaction includes the first computing entity providing an amount of a digital asset associated with a distributed ledger technology via an on-chain transaction through a digital asset-based interaction interface of the first computing entity to a digital asset-based interaction computing entity and the second computing entity accepting assets in a desired asset format;

a second memory element that stores operational instructions that, when executed by one or more of the first computing entity and the digital asset-based interaction computing entity, causes the one or more of the first computing entity and the digital asset-based interaction computing entity to enter an offline interaction mode during the interaction, wherein the offline interaction mode is a result of a disconnection between the first computing entity and the digital asset-based interaction computing entity;

a third memory element that stores operational instructions that, when executed by the first computing entity, causes the first computing entity to:
generate an authorization code that includes an identifier of the first computing entity, a type of the digital asset, and digital asset-based interaction computing system code information, wherein the first computing entity generates the authorization code using at least a portion of stored authentication data; and
provide the authorization code to the second computing entity;

a fourth memory element that stores operational instructions that, when executed by the second computing entity, causes the second computing entity to:
send through a digital asset-based interaction interface of the second computing entity at least a portion of the authorization code and second computing entity real time information to the digital asset-based interaction computing entity, wherein the second computing entity real time information includes the desired asset format and an amount of the interaction; and a fifth memory element that stores operational instructions that, when executed by the digital asset-based interaction computing entity, causes the digital asset-based interaction computing entity to:
verify the at least the portion of the authorization code using at least a portion of the digital asset-based interaction computing system code information;
lock an amount of system digital asset to back the amount of the digital asset such that the interaction can be processed in accordance with a real-time digital asset-based interaction process; and send a confirmation to the second computing entity, wherein the confirmation includes an indication the real-time digital asset-based interaction process is complete.

10. The computer readable memory of claim 9, wherein the fifth memory element further stores operational instructions that, when executed by the digital asset-based interaction computing entity, causes the digital asset-based interaction computing entity to execute the real-time digital asset-based interaction process by:
   obtaining the amount of the digital asset from the first computing entity;
   exchanging the amount of the digital asset for an equivalent amount of assets in the desired asset format; and
   sending the assets in the desired asset format to the second computing entity.

11. The computer readable memory of claim 10, wherein the fifth memory element further stores operational instructions that, when executed by the digital asset-based interaction computing entity, causes the digital asset-based interaction computing entity to:
   implement a nonreal-time verification process associated with the digital asset to verify the obtaining the amount of the digital asset from the first computing entity;
   when the obtaining the amount of the digital asset is verified by the nonreal-time verification process:
      unlock the amount of system digital asset; and
   when the obtaining the amount of the digital asset is not verified by the nonreal-time verification process:
      consume the amount of system digital asset.

12. The computer readable memory of claim 9, wherein the offline interaction mode includes an unintentional or intentional disconnection between the first computing entity and the digital asset-based interaction computing entity.

13. The computer readable memory of claim 9, wherein the digital asset-based interaction computing system code information includes one or more of:
   a public/private key pair;
   a timestamp;
   username;
   password; and
   one or more digital signatures.

14. The computer readable memory of claim 9 further comprises:
   a sixth memory element that stores operational instructions that, when executed by the digital asset-based interaction computing entity, causes the digital asset-based interaction computing entity to:
      prior to entering the offline interaction mode:
         syncing a first computing entity clock with a digital asset-based interaction computing entity clock.

15. The computer readable memory of claim 9 further comprises:
   a sixth memory element further stores operational instructions that, when executed by the digital asset-based interaction computing entity, causes the digital asset-based interaction computing entity to:
      prior to entering the offline interaction mode:
         storing, by the digital asset-based interaction computing entity, the at least a portion of the digital asset-based interaction computing system code information.

16. The computer readable memory of claim 9, wherein the fifth memory element further stores operational instructions that, when executed by the digital asset-based interaction computing entity, causes the digital asset-based interaction computing entity to:
   lock a rate quote for the digital asset.

* * * * *